(12) United States Patent
Masugi

(10) Patent No.: US 11,067,780 B2
(45) Date of Patent: Jul. 20, 2021

(54) ZOOM LENS, OPTICAL APPARATUS AND METHOD FOR MANUFACTURING THE ZOOM LENS

(71) Applicant: Nikon Corporation, Tokyo (JP)

(72) Inventor: Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 526 days.

(21) Appl. No.: 15/781,136

(22) PCT Filed: Dec. 9, 2016

(86) PCT No.: PCT/JP2016/086814
§ 371 (c)(1),
(2) Date: Oct. 31, 2018

(87) PCT Pub. No.: WO2017/099243
PCT Pub. Date: Jun. 15, 2017

(65) Prior Publication Data
US 2019/0056573 A1    Feb. 21, 2019

(30) Foreign Application Priority Data
Dec. 9, 2015 (JP) ............................. JP2015-240654

(51) Int. Cl.
*G02B 15/14* (2006.01)
*G02B 15/20* (2006.01)
(Continued)

(52) U.S. Cl.
CPC ............. *G02B 15/20* (2013.01); *G02B 13/02* (2013.01); *G02B 15/145121* (2019.08);
(Continued)

(58) Field of Classification Search
CPC ...... G02B 15/14; G02B 15/173; G02B 13/18; G02B 13/0045; G02B 27/646; G02B 15/20; G02B 3/02; G02B 13/02
(Continued)

(56) References Cited

U.S. PATENT DOCUMENTS

2007/0229968 A1   10/2007   Satori et al.
2009/0161227 A1   6/2009   Yamamoto et al.
(Continued)

FOREIGN PATENT DOCUMENTS

CN   104777598 A   7/2015
JP   2007-279183 A   10/2007
(Continued)

OTHER PUBLICATIONS

Office Action dated Apr. 23, 2019, in Japanese Patent Application No. 2017-555172.
(Continued)

*Primary Examiner* — Evelyn A Lester
(74) *Attorney, Agent, or Firm* — SGPatents PLLC

(57) ABSTRACT

A zoom lens, comprises: in order from an object, a first lens group (G1) having positive refractive power; a second lens group (G2) having negative refractive power; a third lens group (G3) having positive refractive power; a fourth lens group (G4) having negative refractive power; and a fifth lens group (G5) having positive refractive power, wherein, upon zooming from a wide-angle end state to a telephoto end state, a distance between each of lens groups and a lens group adjacent thereto changes to satisfy the following conditional expression:

$2.90 < |MV5/MV2| < 11.50$ where,
MV5 denotes, upon zooming from a wide-angle end state to a telephoto end state, a moving amount of the fifth lens group with an image surface as a reference; and
(Continued)

MV2 denotes, upon zooming from the wide-angle end state to the telephoto end state, a moving amount of the second lens group with the image surface as the reference.

21 Claims, 18 Drawing Sheets

(51) Int. Cl.
  *G02B 15/173* (2006.01)
  *G02B 13/02* (2006.01)
  *G02B 13/18* (2006.01)
  *G02B 13/00* (2006.01)
  *G02B 27/64* (2006.01)

(52) U.S. Cl.
  CPC ........ *G02B 15/173* (2013.01); *G02B 13/0045* (2013.01); *G02B 13/18* (2013.01); *G02B 15/14* (2013.01); *G02B 27/646* (2013.01)

(58) Field of Classification Search
  USPC ................ 359/557, 676, 683–686, 740, 766
  See application file for complete search history.

(56) References Cited

U.S. PATENT DOCUMENTS

| | | |
|---|---|---|
| 2009/0174952 A1 | 7/2009 | Satori |
| 2011/0080650 A1 | 4/2011 | Nanba |
| 2011/0261250 A1 | 10/2011 | Touchi et al. |
| 2011/0267504 A1 | 11/2011 | Ichikawa |
| 2012/0026600 A1 | 2/2012 | Matsumura et al. |
| 2012/0194730 A1 | 8/2012 | Morooka et al. |
| 2012/0307373 A1 | 12/2012 | Hamano et al. |
| 2012/0327272 A1 | 12/2012 | Bito |
| 2013/0100335 A1 | 4/2013 | Nanba |
| 2013/0169846 A1 | 7/2013 | Yanai et al. |
| 2013/0242408 A1 | 9/2013 | Nanba |
| 2014/0009832 A1 | 1/2014 | Sugita |
| 2014/0022447 A1 | 1/2014 | Takahashi et al. |
| 2014/0125827 A1 | 5/2014 | Mimura et al. |
| 2014/0211074 A1 | 7/2014 | Mimura et al. |
| 2014/0268365 A1 | 9/2014 | Nishio et al. |
| 2014/0347546 A1* | 11/2014 | Obikane ................ G02B 15/14 359/694 |
| 2014/0354857 A1 | 12/2014 | Kato et al. |
| 2014/0368699 A1 | 12/2014 | Morooka et al. |
| 2015/0103211 A1* | 4/2015 | Bito ........................ G02B 15/16 359/695 |
| 2015/0160442 A1* | 6/2015 | Nanba .................. G02B 13/009 359/687 |
| 2015/0185494 A1* | 7/2015 | Nanba .................. G02B 15/173 359/557 |
| 2015/0234163 A1* | 8/2015 | Sashima .............. G02B 27/646 359/686 |
| 2015/0370050 A1* | 12/2015 | Mimura ............... G02B 15/173 359/683 |
| 2015/0370051 A1 | 12/2015 | Morooka et al. |
| 2016/0062096 A1* | 3/2016 | Hatada .................... G02B 15/20 359/683 |
| 2016/0154227 A1* | 6/2016 | Iwasawa .................. G02B 7/08 359/684 |
| 2016/0349491 A1 | 12/2016 | Suzuki |
| 2018/0017770 A1* | 1/2018 | Kon ..................... G02B 27/646 |
| 2018/0017771 A1* | 1/2018 | Kawamura .......... G02B 15/163 |

FOREIGN PATENT DOCUMENTS

| | | |
|---|---|---|
| JP | 2009-163066 A | 7/2009 |
| JP | 2009-186983 A | 8/2009 |
| JP | 2011-075975 A | 4/2011 |
| JP | 2011-232543 A | 11/2011 |
| JP | 2011-232620 A | 11/2011 |
| JP | 2012-048199 A | 3/2012 |
| JP | 2012-159578 A | 8/2012 |
| JP | 2012-247758 A | 12/2012 |
| JP | 2013-088737 A | 5/2013 |
| JP | 2013-117667 A | 6/2013 |
| JP | 2013-137464 A | 7/2013 |
| JP | 2013-190534 A | 9/2013 |
| JP | 2013-235218 A | 11/2013 |
| JP | 2014-010425 A | 1/2014 |
| JP | 2014-021367 A | 2/2014 |
| JP | 2014-095754 A | 5/2014 |
| JP | 2014-145983 A | 8/2014 |
| JP | 2014-178478 A | 9/2014 |
| JP | 2014-235238 A | 12/2014 |
| JP | 2015-001550 A | 1/2015 |
| JP | 2015-072369 A | 4/2015 |
| JP | 2015-179189 A | 10/2015 |
| WO | WO 2012/101959 A1 | 8/2012 |
| WO | WO 2015/075904 A1 | 5/2015 |

OTHER PUBLICATIONS

English Translation of International Search Report from International Patent Application No. PCT/JP2016/086814, dated Mar. 7, 2017.

English Translation of International Preliminary Report on Patentability from International Patent PCT/JP2016/086814, dated Jun. 21, 2018.

Office Action dated Mar. 18, 2020, in Japanese Patent Application No. 2017-555172.

Office Action dated Dec. 16, 2019, in Chinese Patent Application No. 201680072095.5.

Office Action dated Sep. 21, 2020, in Chinese Patent Application No. 201680072095.5.

Office Action dated Dec. 22, 2020, in Japanese Patent Application No. 2017-555172.

* cited by examiner

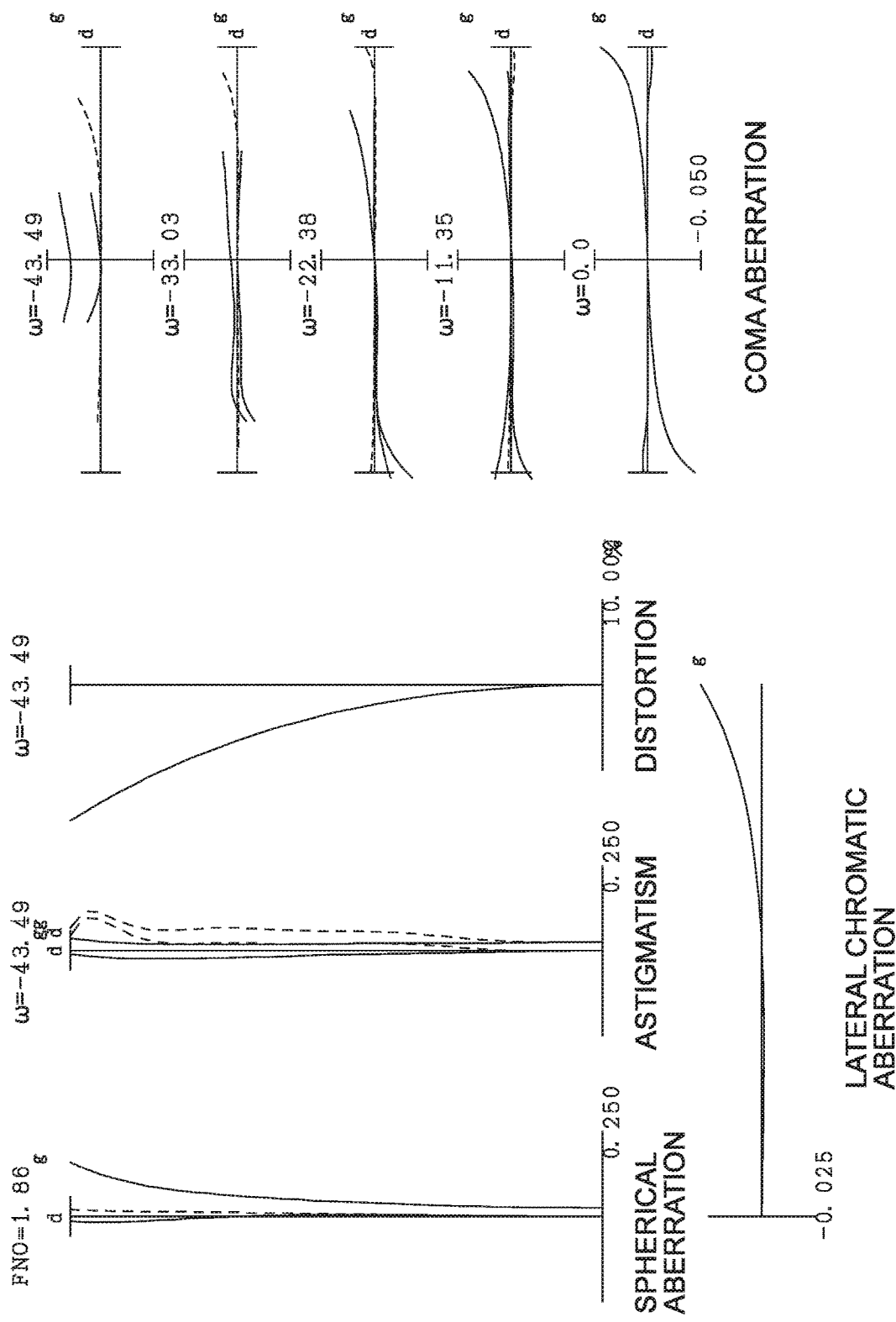

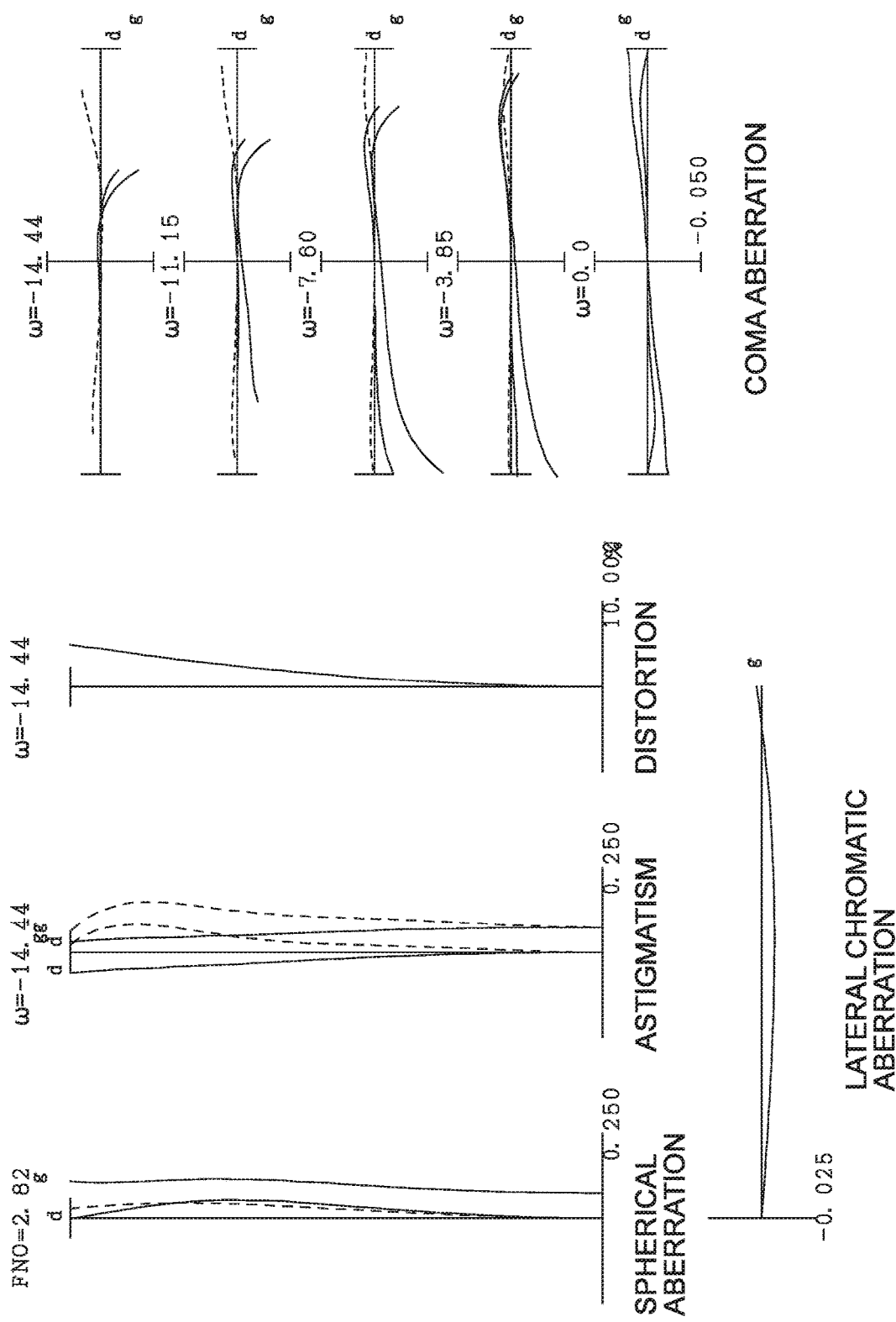

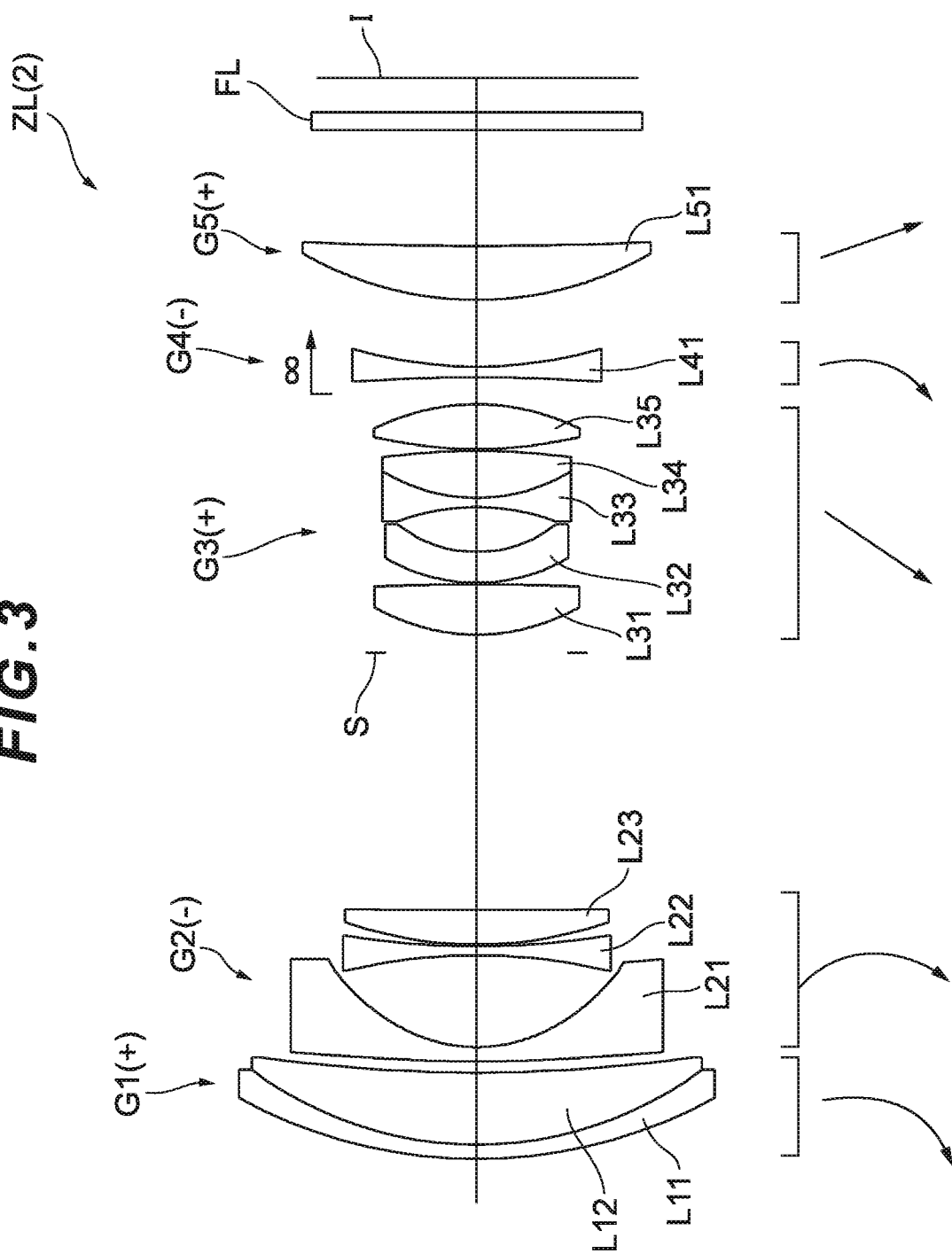

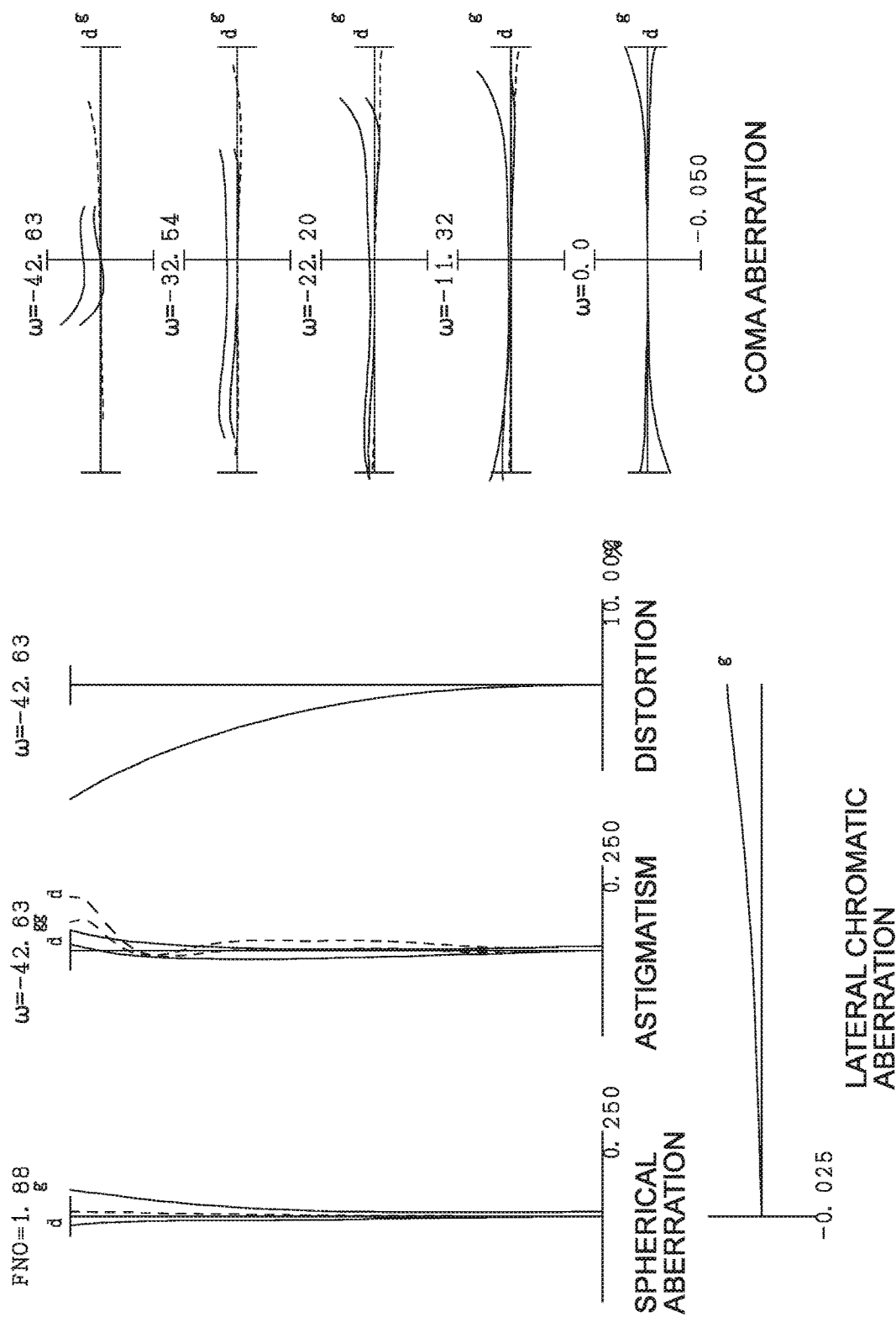

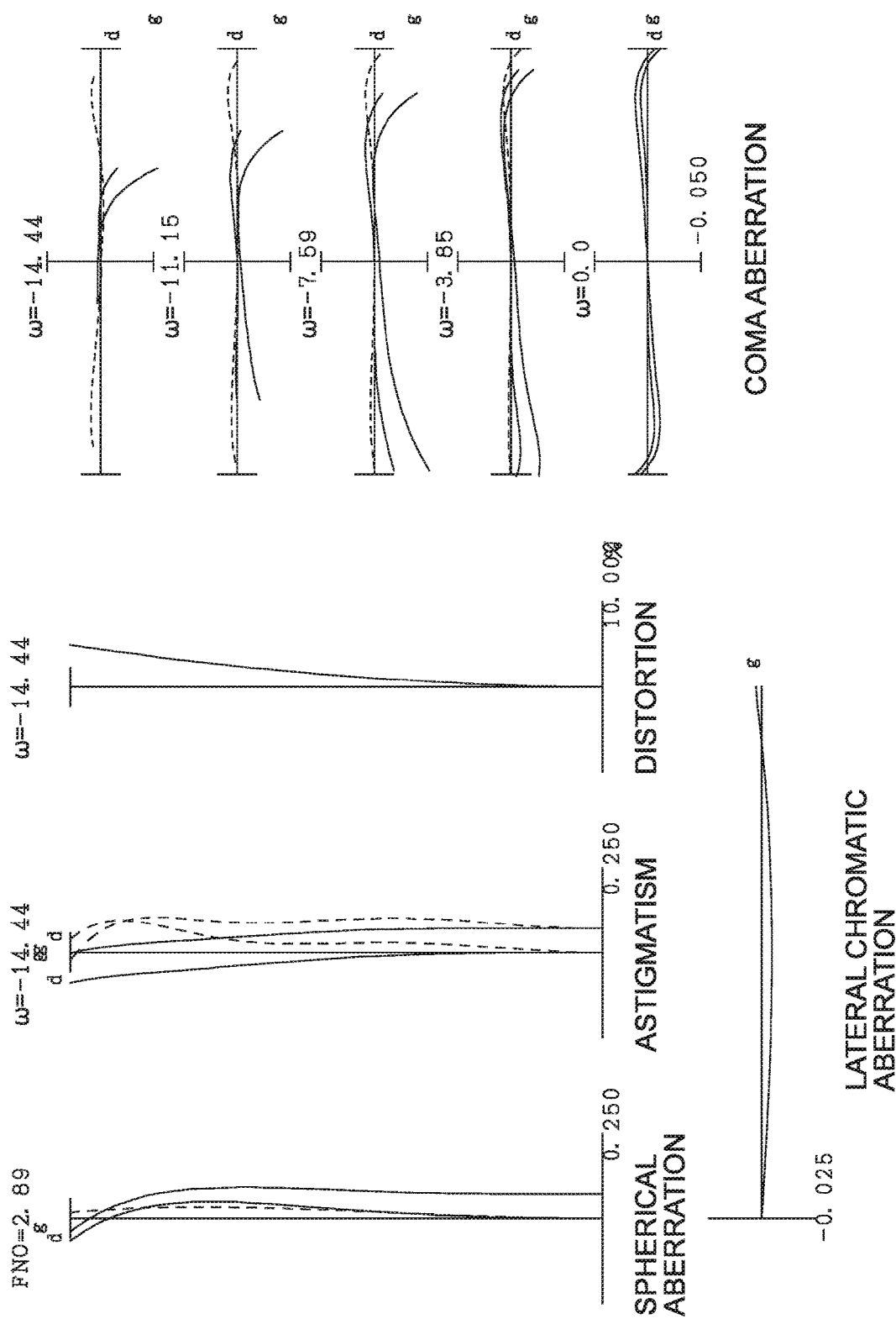

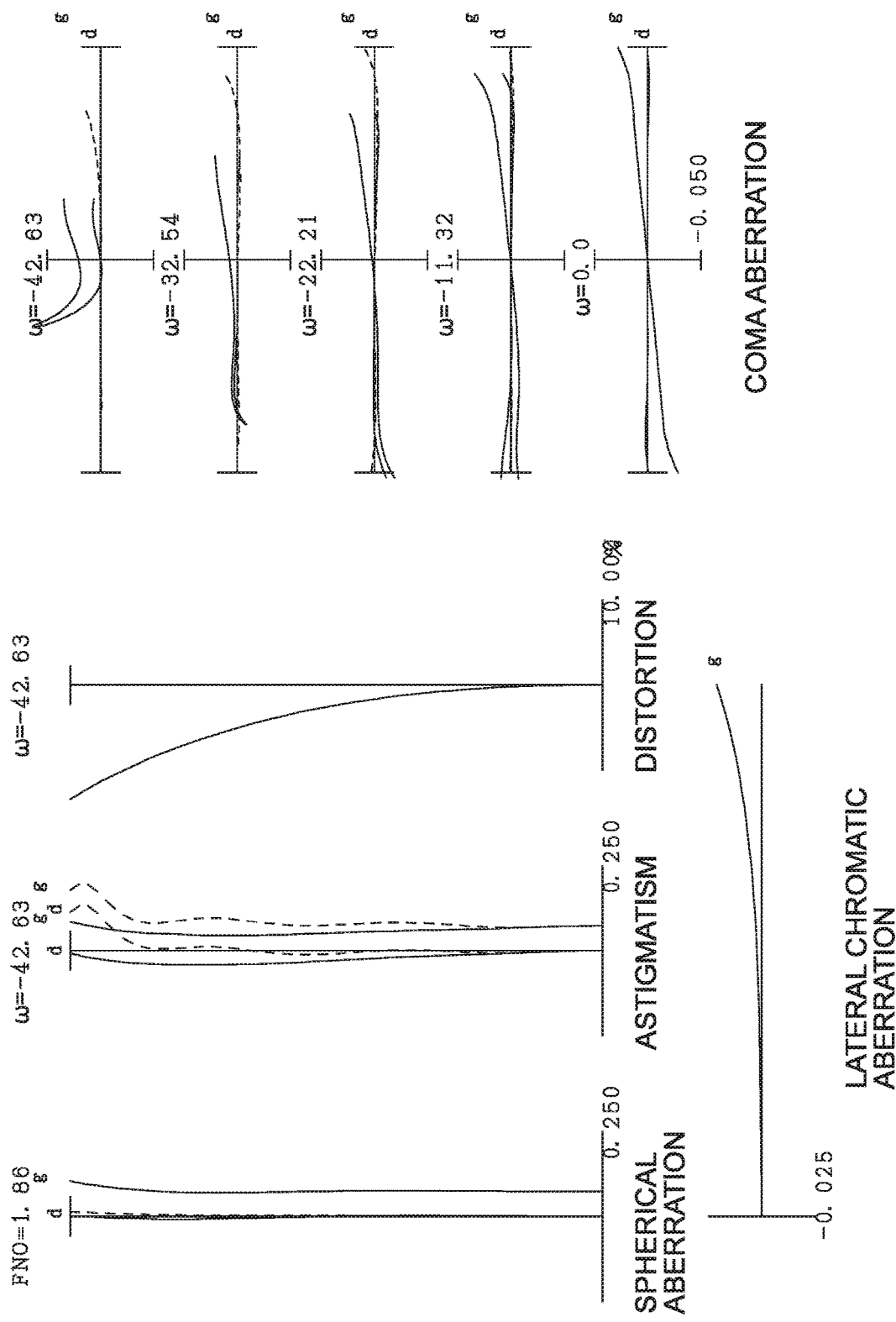

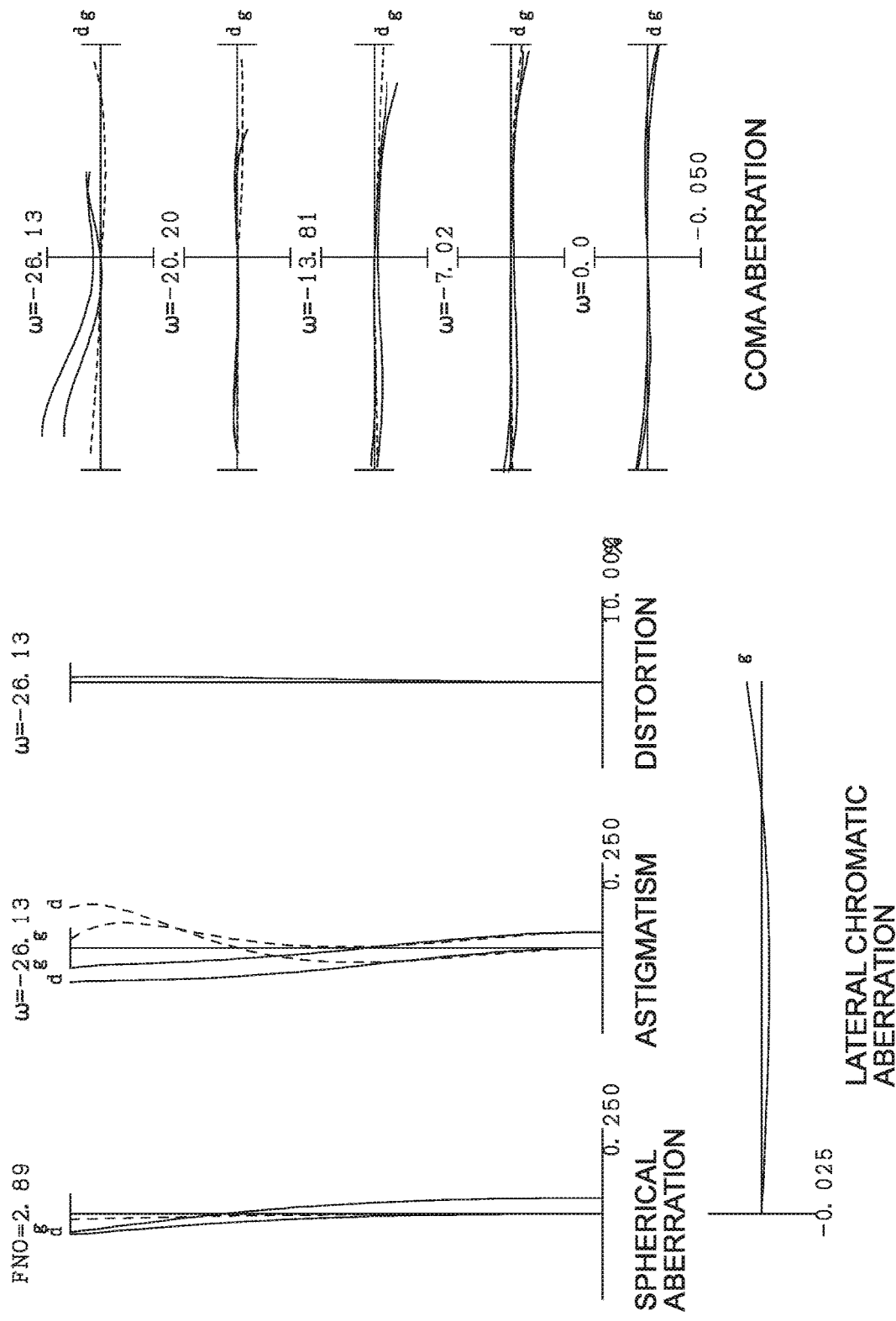

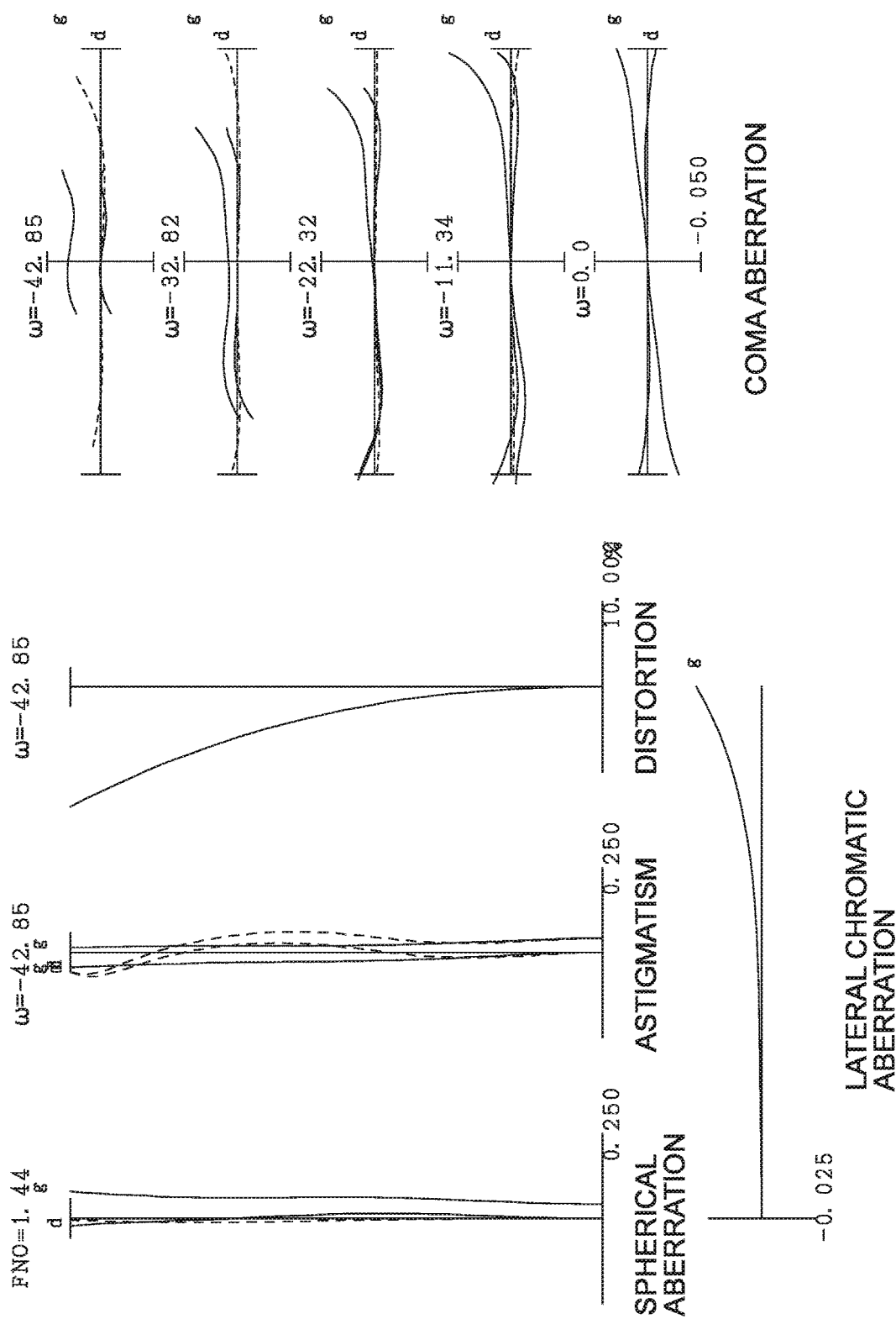

ZOOM LENS, OPTICAL APPARATUS AND METHOD FOR MANUFACTURING THE ZOOM LENS

TECHNICAL FIELD

The present invention relates to a zoom lens, an optical apparatus using the same and a method for manufacturing the zoom lens.

TECHNICAL BACKGROUND

As a wide-angle zoom lens having a zoom ratio of about 4, proposals have so far been made on a zoom lens which comprises, in order from an object, a first lens group having positive refractive power, a second lens group having negative refractive power, a third lens group having positive refractive power, and a fourth lens group having negative refractive power to perform zooming by moving each lens group (see Patent Document 1, for example). The zoom lens proposed in Patent Document 1 has achieved an aperture ratio in an F-number of about 2.8 to about 6 at a zooming rate of about 4 by moving, upon zooming, the first to the fourth lens groups. However, a further higher aperture ratio and a further higher zooming rate have been required. In particular, a zoom lens having a high zooming rate preferable for a video camera, an electronic still camera or the like using a solid state imaging device or the like has been required.

PRIOR ARTS LIST

Patent Document

Patent Document 1: Japanese Laid-Open Patent Publication No. 2012-247758(A)

SUMMARY OF THE INVENTION

A zoom lens according to the present invention comprises, in order from an object, a first lens group having positive refractive power, a second lens group having negative refractive power, a third lens group having positive refractive power, a fourth lens group having negative refractive power, and a fifth lens group having positive refractive power, in which, upon zooming from a wide-angle end state to a telephoto end state, a distance between each of lens groups and a lens group adjacent thereto changes to satisfy the following conditional expression:

$$2.90 < |MV5/MV2| < 11.50$$

where, MV5 denotes, upon zooming from a wide-angle end state to a telephoto end state, a moving amount of the fifth lens group with an image surface as a reference, and MV2 denotes, upon zooming from the wide-angle end state to the telephoto end state, a moving amount of the second lens group with the image surface as the reference.

An optical apparatus according to the present invention comprises mounting the zoom lens as described above.

A manufacturing method according to the present invention comprises a step in which, in order from an object, a first lens group having positive refractive power, a second lens group having negative refractive power, a third lens group having positive refractive power, a fourth lens group having negative refractive power, and a fifth lens group having positive refractive power are arranged within a lens barrel, and upon zooming from a wide-angle end state to a telephoto end state, a distance between each of lens groups and a lens group adjacent thereto changes to satisfy the following conditional expression:

$$2.90 < |MV5/MV2| < 11.50$$

where, MV5 denotes, upon zooming from a wide-angle end state to a telephoto end state, a moving amount of the fifth lens group with an image surface as a reference, and MV2 denotes, upon zooming from the wide-angle end state to the telephoto end state, a moving amount of the second lens group with the image surface as the reference.

BRIEF DESCRIPTION OF THE DRAWINGS

FIGS. 2A, 2B, and 2C each show various aberrations of the zoom lens according to Example 1 in a wide-angle end state, in an intermediate focal length state, and in a telephoto end state.

FIG. 3 shows a cross section showing a lens configuration of a zoom lens according to Example 2 of the present embodiment.

FIGS. 4A, 4B, and 4C each show various aberrations of the zoom lens according to Example 2 in a wide-angle end state, in an intermediate focal length state, and in a telephoto end state.

FIGS. 6A, 6B, and 6C each show various aberrations of the zoom lens according to Example 3 in a wide-angle end state, in an intermediate focal length state, and in a telephoto end state.

FIGS. 8A, 8B, and 8C each show various aberrations of the zoom lens according to Example 4 in a wide-angle end state, in an intermediate focal length state, and in a telephoto end state.

DESCRIPTION OF THE EMBODIMENTS

Figure 1:
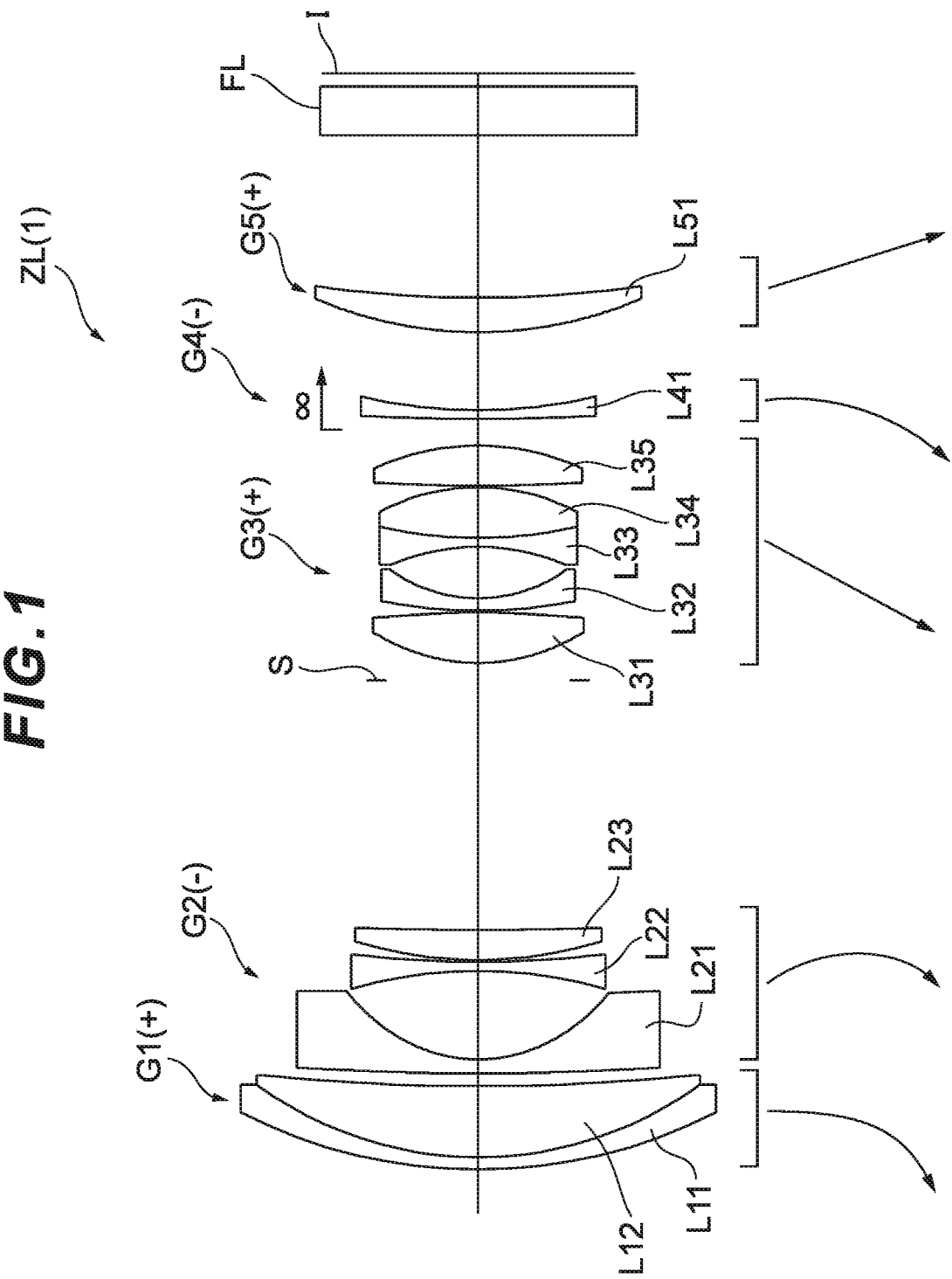
FIG. 1 shows a cross section showing a lens configuration of a zoom lens according to Example 1 of the present embodiment.

Hereinafter, a zoom lens or an optical apparatus according to first and second embodiments of the present application will be described with reference to accompanying drawings. As shown in FIG. 1, a zoom lens ZL(1) as one example of a zoom lens ZL according to the first embodiment of the present application comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. In the zoom lens ZL according to the first embodiment of the present application, upon zooming from a wide-angle end state to a telephoto end state, each of lens groups and a lens group adjacent thereto (namely, first to fifth lens groups G1 to G5) move in an optical axis direction as shown by an arrow in FIG. 1. Under such a configuration, the zoom lens ZL according to the first embodiment of the present application satisfies the following conditional expression (1):

$$2.90 < |MV5/MV2| < 11.50 \qquad (1)$$

where, MV5 denotes, upon zooming from a wide-angle end state to a telephoto end state, a moving amount of the fifth lens group with an image surface as a reference, and MV2 denotes, upon zooming from the wide-angle end state to the telephoto end state, a moving amount of the second lens group with the image surface as the reference.

Figure 5:
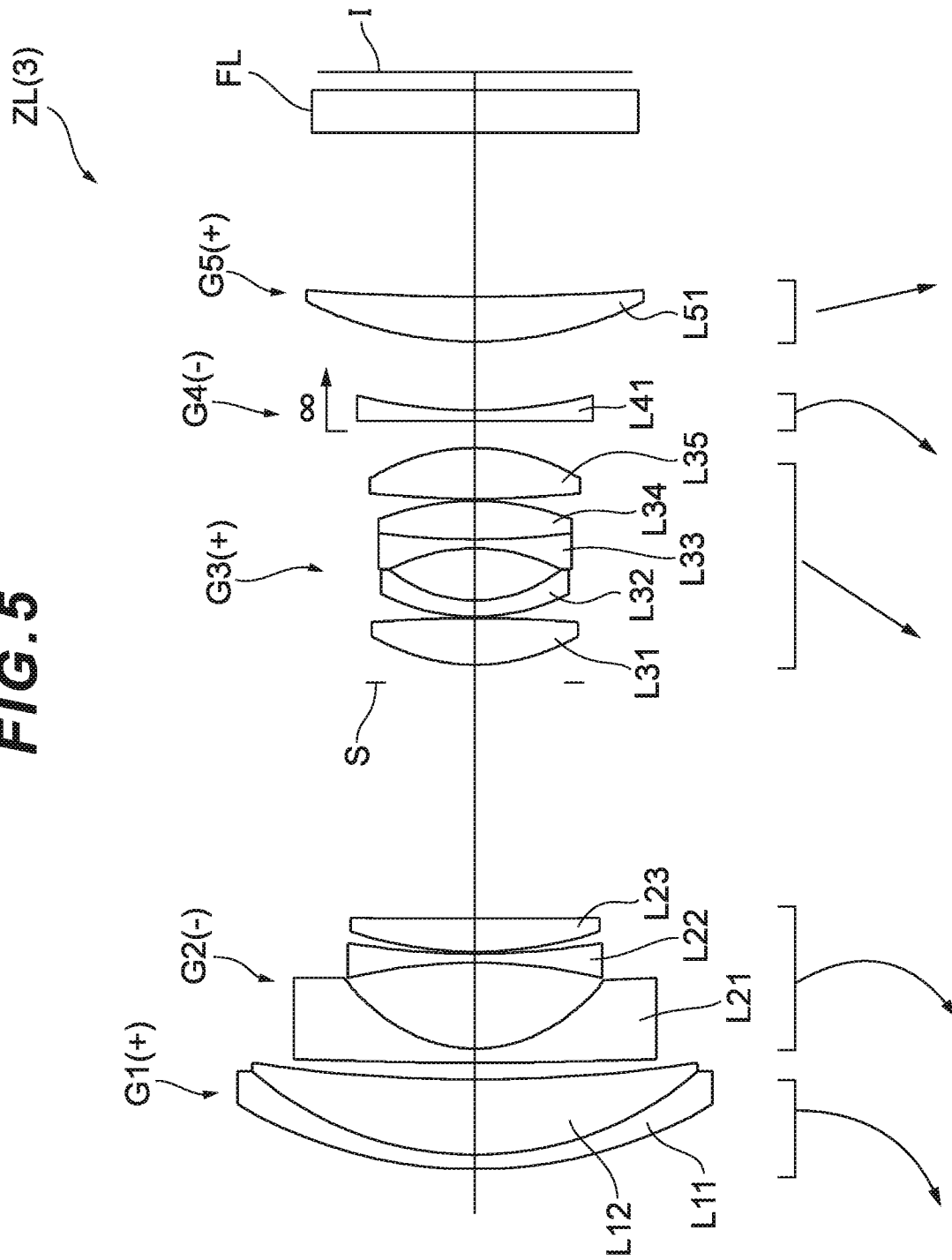
FIG. 5 shows a cross section showing a lens configuration of a zoom lens according to Example 3 of the present embodiment.
Figure 7:
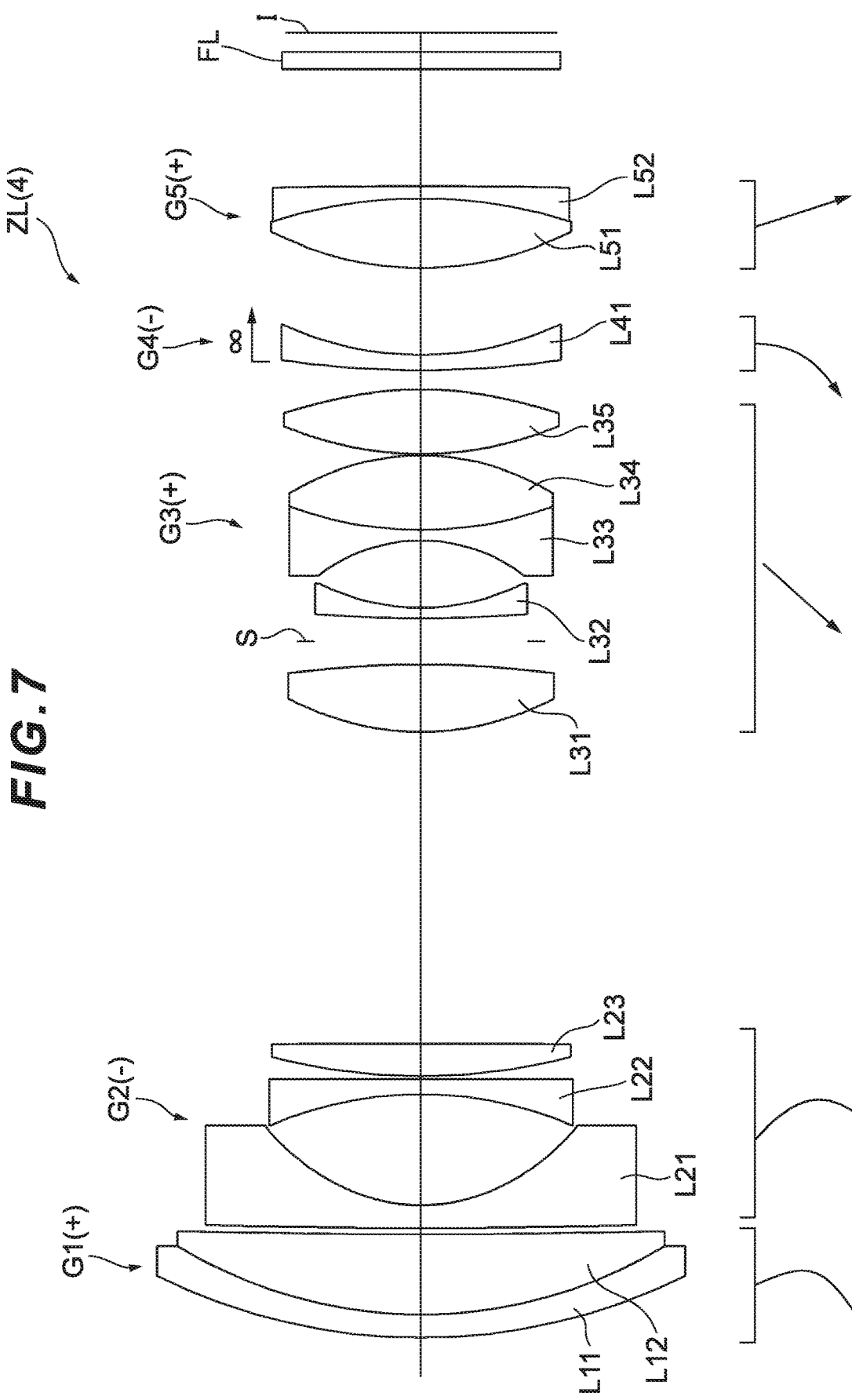
FIG. 7 shows a cross section showing a lens configuration of a zoom lens according to Example 4 of the present embodiment.

The zoom lens ZL according to the first embodiment of the present application may be a zoom lens ZL(2) shown in FIG. 3, a zoom lens ZL(3) shown in FIG. 5, or a zoom lens ZL(4) shown in FIG. 7.

A wide angle and a high magnification can be achieved by comprising the zoom lens ZL according to the first embodiment of the present application as described above while maintaining a size of a lens as a whole, and a coma aberration and astigmatism. According to the first embodiment of the present application, the zoom lens preferable for a video camera, an electronic still camera or the like using a solid state imaging device or the like can be obtained.

The conditional expression (1) specifies, upon zooming from the wide-angle end state to the telephoto end state, a proper range for a ratio of the moving amount of the fifth lens group to the moving amount of the second lens group. In both cases where a value is more than or less than the specified range in the present conditional expression (1), the coma aberration or the astigmatism is deteriorated, and therefore such a case is not preferable.

In order to ensure an effect of the first embodiment of the present application, a lower limit in the conditional expression (1) is preferably adjusted to 3.10. In order to further ensure the effect of the first embodiment of the present application, the lower limit in the conditional expression (1) is preferably adjusted to 3.30. In order to still further ensure the effect of the first embodiment, the lower limit in the conditional expression (1) is preferably adjusted to 3.50. In order to ensure the effect of the first embodiment of the present application, an upper limit in the conditional expression (1) is preferably adjusted to 11.00. In order to further ensure the effect of the first embodiment of the present application, the upper limit in the conditional expression (1) is preferably adjusted to 10.50. In order to still further ensure the effect of the first embodiment of the present application, the upper limit in the conditional expression (1) is preferably adjusted to 10.00.

The zoom lens ZL according to the first embodiment of the present application preferably satisfies the following conditional expression (3):

$$6.00 < |MV4/MV2| < 15.00 \qquad (3)$$

where, MV4 denotes, upon zooming from a wide-angle end state to a telephoto end state, a moving amount of the fourth lens group with an image surface as a reference.

The conditional expression (3) specifies, upon zooming from the wide-angle end state to the telephoto end state, a proper range of a ratio of the moving amount of the fourth lens group to the moving amount of the second lens group. In both cases where a value is more than or less than the specified range in the present conditional expression, the coma aberration or the astigmatism is deteriorated, and therefore such a case is not preferable.

In order to ensure the effect of the first embodiment of the present application, a lower limit in the conditional expression (3) is preferably adjusted to 7.00. In order to further ensure the effect of the first embodiment of the present application, the lower limit in the conditional expression (3) is preferably adjusted to 8.00. In order to still further ensure the effect of the first embodiment of the present application, the lower limit in the conditional expression (3) is preferably adjusted to 9.00. In order to ensure the effect of the first embodiment of the present application, an upper limit in the conditional expression (3) is preferably adjusted to 14.50. In order to further ensure the effect of the first embodiment of the present application, the upper limit in the conditional expression (3) is preferably adjusted to 14.00. In order to still further ensure the effect of the first embodiment of the present application, the upper limit in the conditional expression (3) is preferably adjusted to 13.40.

In the zoom lens ZL according to the first embodiment of the present application, upon zooming from the wide-angle end state to the telephoto end state, the fifth lens group G5 preferably moves to an image (I). Accordingly, a high magnification can be achieved and various aberrations such as the astigmatism can be reduced.

The zoom lens ZL according to the first embodiment of the present application preferably satisfies the following conditional expression (2):

$$1.20 < \beta 2t/\beta 2w < 2.50 \qquad (2)$$

where, $\beta 2t$ denotes a magnification of the second lens group in a telephoto end state, and $\beta 2w$ denotes a magnification of the second lens group in a wide-angle end state.

The conditional expression (2) specifies a proper range of a ratio of the magnification of the second lens group in the wide-angle end state and the telephoto end state. In both cases where a value is more than or less than the specified range in the present conditional expression, the coma aberration or the astigmatism is deteriorated, and therefore such a case is not preferable.

In order to ensure the effect of the first embodiment of the present application, a lower limit in the conditional expression (2) is preferably adjusted to 1.25. In order to further ensure the effect of the first embodiment of the present application, the lower limit in the conditional expression (2) is preferably adjusted to 1.30. In order to still further ensure the effect of the first embodiment of the present application, the lower limit in the conditional expression (2) is preferably adjusted to 1.35. In order to ensure the effect of the first embodiment of the present application, an upper limit in the conditional expression (2) is preferably adjusted to 2.30. In order to further ensure the effect of the first embodiment of the present application, the upper limit in the conditional expression (2) is preferably adjusted to 2.10. In order to still further ensure the effect of the first embodiment of the present application, the upper limit in the conditional expression (2) is preferably adjusted to 1.90.

The zoom lens ZL according to the first embodiment of the present application preferably satisfies the following conditional expression (4):

$$0.10 < (\beta 2t \times \beta 4w)/(\beta 2w \times \beta 4t) < 2.40 \qquad (4)$$

where, $\beta 4t$ denotes a magnification of the fourth lens group in a telephoto end state, and $\beta 4w$ denotes a magnification of the fourth lens group in a wide-angle end state.

The conditional expression (4) specifies, upon zooming from the wide-angle end state to the telephoto end state, a proper range of a magnification change ratio between the second lens group and the fourth lens group. In both cases where a value is more than or less than the specified range in the present conditional expression, the coma aberration or the astigmatism is deteriorated, and therefore such a case is not preferable.

In order to ensure the effect of the first embodiment of the present application, a lower limit in the conditional expression (4) is preferably adjusted to 0.40. In order to further ensure the effect of the first embodiment of the present application, the lower limit in the conditional expression (4) is preferably adjusted to 0.70. In order to still further ensure the effect of the first embodiment of the present application, the lower limit in the conditional expression (4) is preferably adjusted to 1.00. In order to ensure the effect of the first embodiment of the present application, an upper limit in the conditional expression (4) is preferably adjusted to 2.20. In order to further ensure the effect of the first embodiment of the present application, the upper limit in the conditional expression (4) is preferably adjusted to 2.00. In order to still further ensure the effect of the first embodiment of the present application, the upper limit in the conditional expression (4) is preferably adjusted to 1.80.

The zoom lens ZL according to the first embodiment of the present application preferably satisfies the following conditional expression (5):

$$1.50 < TLt/ft < 5.00 \quad (5)$$

where, TLt denotes a total length of the zoom lens in a telephoto end state, and ft denotes a focal length of the zoom lens as a whole in the telephoto end state.

The conditional expression (5) specifies a proper range of a ratio of the total length to the focal length in the telephoto end state. In both cases where a value is more than or less than the specified range in the present conditional expression, a spherical aberration, the coma aberration or the astigmatism is deteriorated, and therefore such a case is not preferable.

In order to ensure the effect of the first embodiment of the present application, a lower limit in the conditional expression (5) is preferably adjusted to 1.70. In order to further ensure the effect of the first embodiment of the present application, the lower limit in the conditional expression (5) is preferably adjusted to 1.90. In order to still further ensure the effect of the first embodiment of the present application, the lower limit in the conditional expression (5) is preferably adjusted to 2.10. In order to ensure the effect of the first embodiment of the present application, an upper limit in the conditional expression (5) is preferably adjusted to 4.60. In order to further ensure the effect of the first embodiment of the present application, the upper limit in the conditional expression (5) is preferably adjusted to 4.20. In order to still further ensure the effect of the first embodiment of the present application, the upper limit in the conditional expression (5) is preferably adjusted to 3.70.

The zoom lens according to the first embodiment of the present application preferably satisfies the following conditional expression (6):

$$28.0 < \omega w < 65.0 \quad (6)$$

where, ωw denotes a half angle of view (unit: degree) of the zoom lens as a whole in a wide-angle end state.

The conditional expression (6) is a conditional expression specifying an optimum value of the half angle of view in the wide-angle end state. Various aberrations such as the coma aberration, a curvature of field, and a distortion can be successfully corrected while having a wide half angle of view by satisfying the present conditional expression.

In order to ensure the effect of the first embodiment of the present application, a lower limit in the conditional expression (6) is preferably adjusted to 30.0. In order to further ensure the effect of the first embodiment of the present application, the lower limit in the conditional expression (6) is preferably adjusted to 32.0. In order to still further ensure the effect of the first embodiment of the present application, the lower limit in the conditional expression (6) is preferably adjusted to 35.0. In order to still further ensure the effect of the first embodiment of the present application, the lower limit in the conditional expression (6) is preferably adjusted to 38.0. In order to still further ensure the effect of the first embodiment of the present application, the lower limit in the conditional expression (6) is preferably adjusted to 40.0. In order to ensure the effect of the first embodiment of the present application, an upper limit in the conditional expression (6) is preferably adjusted to 60.0. In order to further ensure the effect of the first embodiment of the present application, the upper limit in the conditional expression (6) is preferably adjusted to 55.0. In order to still further ensure the effect of the first embodiment of the present application, the upper limit in the conditional expression (6) is preferably adjusted to 50.0. In order to still further ensure the effect of the first embodiment of the present application, the upper limit in the conditional expression (6) is preferably adjusted to 46.0.

The zoom lens according to the first embodiment of the present application preferably satisfies the following conditional expression (7):

$$5.0 < \omega t < 25.0 \quad (7)$$

where, ωt denotes a half angle of view (unit: degree) of the zoom lens as a whole in a telephoto end state.

The conditional expression (7) is a conditional expression specifying an optimum value of the half angle of view of the zoom lens in the telephoto end state. Various aberrations such as the coma aberration, the curvature of field, and the distortion can be successfully corrected by satisfying the present conditional expression.

In order to ensure the effect of the first embodiment of the present application, a lower limit in the conditional expression (7) is preferably adjusted to 7.0. In order to further ensure the effect of the first embodiment of the present application, the lower limit in the conditional expression (7) is preferably adjusted to 9.0. In order to still further ensure the effect of the first embodiment of the present application, the lower limit in the conditional expression (7) is preferably adjusted to 10.0. In order to still further ensure the effect of the first embodiment of the present application, the lower limit in the conditional expression (7) is preferably adjusted to 12.0.

In order to ensure the effect of the first embodiment of the present application, an upper limit in the conditional expression (7) is preferably adjusted to 23.0. In order to further ensure the effect of the first embodiment of the present application, the upper limit in the conditional expression (7) is preferably adjusted to 21.0. In order to still further ensure the effect of the first embodiment of the present application, the upper limit in the conditional expression (7) is preferably adjusted to 19.0. In order to still further ensure the effect of the first embodiment of the present application, the upper limit in the conditional expression (7) is preferably adjusted to 17.0. In order to still further ensure the effect of the first embodiment of the present application furthermore, the upper limit in the conditional expression (7) is preferably adjusted to 16.0.

In the zoom lens ZL according to the first embodiment of the present application, at least part of the fourth lens group is preferably formed in a focusing lens. Accordingly, variations of various aberrations such as the spherical aberration, and the coma aberration upon focusing can be reduced. It should be noted that the zoom lens has a configuration in which, upon focusing from infinity to a short distance object, at least part of the fourth lens group constituting the focusing lens moves to an image in the optical axis direction.

In the zoom lens ZL according to the first embodiment of the present application, at least part of the third lens group preferably comprises a vibration-proof lens group having a displacement component in a direction perpendicular to an optical axis. Accordingly, variations of various aberrations such as the coma aberration upon correcting an image shake can be reduced.

Figure 9:
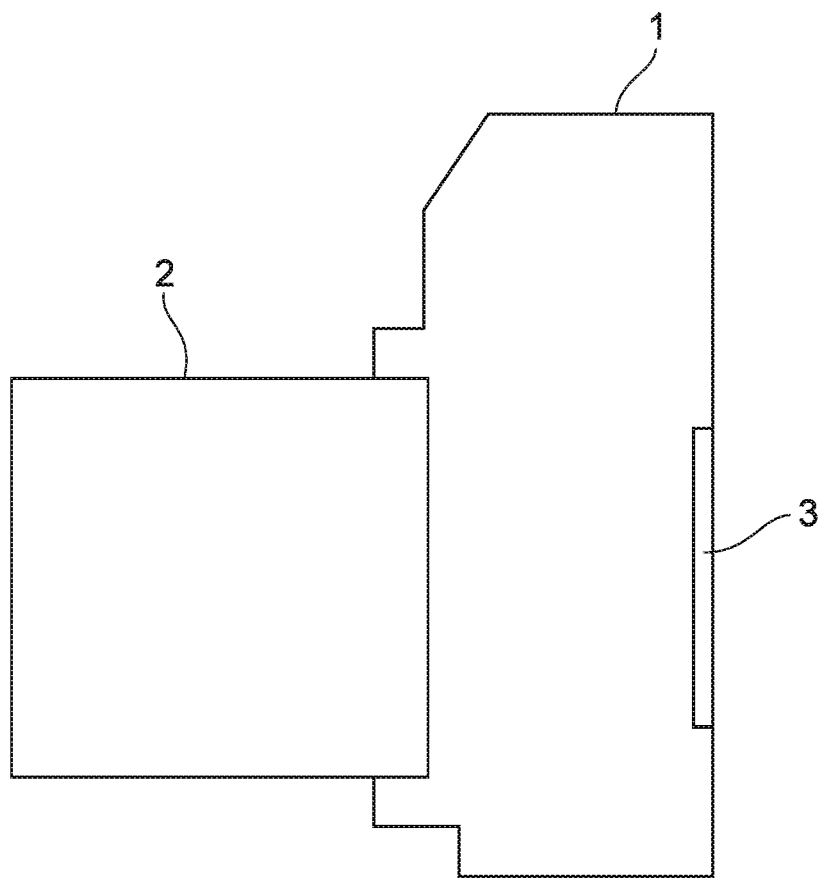
FIG. 9 schematically shows a configuration of a camera comprising a zoom lens according to the present embodiment.

The optical apparatus according to the first embodiment of the present application comprises the zoom lens ZL according to the first embodiment of the present application described above. As a specific example thereof, a camera (optical apparatus) having the zoom lens ZL described above will be described based on FIG. 9. As shown in FIG. 9, the camera 1 is a digital camera having the zoom lens ZL according to the first embodiment of the present application described above as a photographing lens 2. In the camera 1, light from an object (subject) (not shown) is condensed thereon by the photographing lens 2 to reach an imaging device 3. Thus, the light from the subject is photographed by the imaging device 3, and is stored in a memory (not shown) as a subject image. Thus, a photographer can photograph the subject by the camera 1. It should be noted that the camera may be a mirror-less camera or a single-lens reflex camera with a quick return mirror.

According to the configuration described above, the camera 1 in which the zoom lens ZL according to the first embodiment of the present application described above is mounted as the photographing lens 2 is preferable for the video camera, the electronic still camera or the like using the solid state imaging device or the like, and high magnification performance with the wide angle can be obtained while suppressing the size of the lens as a whole and maintaining the astigmatism and a chromatic aberration.

Subsequently, a method for manufacturing the zoom lens ZL according to the first embodiment of the present application described above will be described with referring to FIG. 10. First, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power are arranged within a lens barrel (step ST1). Next, upon zooming from a wide-angle end state to a telephoto end state, the lens groups comprise in such a manner that a distance between each of lens groups G1 to G5 and a lens group adjacent thereto changes (step ST2). Further, the lens groups are configured so as to satisfy a predetermined conditional expression or the conditional expression (1) described above (step ST3).

According to the manufacturing method of the first embodiment of the present application, the zoom lens capable of successfully correcting various aberrations, and having excellent optical performance with a wide angle and a large aperture can be manufactured.

Subsequently, a second embodiment of the present application will be described. As shown in FIG. 1, a zoom lens ZL(1) as one example of the zoom lens ZL according to the second embodiment of the present application comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. In the zoom lens ZL according to the present embodiment, upon zooming from a wide-angle end state to a telephoto end state, each of lens groups and a lens group adjacent thereto (namely, first to fifth lens groups G1 to G5) move in an optical axis direction as shown by an arrow in FIG. 1. Under such a configuration, the zoom lens ZL according to the second embodiment of the present application satisfies the following conditional expression (3):

$$6.00<|MV4/MV2|<15.00 \quad (3)$$

where, MV4 denotes, upon zooming from a wide-angle end state to a telephoto end state, a moving amount of the fourth lens group with an image surface as a reference, and MV2 denotes, upon zooming from the wide-angle end state to the telephoto end state, a moving amount of the second lens group with the image surface as the reference.

The conditional expression (3) specifies a proper range of a ratio of the moving amount of the second lens group to the moving amount of the fourth lens group. In both cases where a value is more than or less than the specified range in the present conditional expression, the coma aberration or the astigmatism is deteriorated, and therefore such a case is not preferable.

In order to ensure an effect of the second embodiment of the present application, a lower limit in the conditional expression (3) is preferably adjusted to 7.00. In order to further ensure the effect of the second embodiment of the present application, the lower limit in the conditional expression (3) is preferably adjusted to 8.00. In order to still further ensure the effect of the second embodiment of the present application, the lower limit in the conditional expression (3) is preferably adjusted to 9.00. In order to ensure the effect of the second embodiment of the present application, an upper limit in the conditional expression (3) is preferably adjusted to 14.50. In order to further ensure the effect of the second embodiment of the present application, the upper limit in the conditional expression (3) is preferably adjusted to 14.00. In order to still further ensure the effect of the second embodiment of the present application, the upper limit in the conditional expression (3) is preferably adjusted to 13.40.

In the zoom lens ZL according to the second embodiment of the present application, upon zooming from the wide-angle end state to the telephoto end state, the fifth lens group G5 preferably moves to an image (I). Accordingly, a high magnification can be achieved and various aberrations such as the astigmatism can be reduced.

The zoom lens ZL according to the second embodiment of the present application preferably satisfies the following conditional expression (2):

$$1.20<\beta 2t/\beta 2w<2.50 \quad (2)$$

where, $\beta 2t$ denotes a magnification of the second lens group in a telephoto end state, and $\beta 2w$ denotes a magnification of the second lens group in a wide-angle end state.

The conditional expression (2) specifies a proper range of a ratio of the magnification of the second lens group in the telephoto end state and the wide-angle end state. In both cases where a value is more than or less than the specified range in the present conditional expression, the coma aberration or the astigmatism is deteriorated, and therefore such a case is not preferable.

In order to ensure the effect of the second embodiment of the present application, a lower limit in the conditional expression (2) is preferably adjusted to 1.25. In order to further ensure the effect of the second embodiment of the present application, the lower limit in the conditional expression (2) is preferably adjusted to 1.30. In order to still further ensure the effect of the second embodiment of the present application, the lower limit in the conditional expression (2) is preferably adjusted to 1.35. In order to ensure the effect of the second embodiment of the present application, an upper limit in the conditional expression (2) is preferably adjusted to 2.30. In order to further ensure the effect of the second embodiment of the present application, the upper limit in the conditional expression (2) is preferably adjusted to 2.10. In order to still further ensure the effect of the second embodiment of the present application, the upper limit in the conditional expression (2) is preferably adjusted to 1.90.

The zoom lens ZL according to the second embodiment of the present application preferably satisfies the following conditional expression (4):

$$0.10 < (\beta 2t \times \beta 4w)/(\beta 2w \times \beta 4t) < 2.40 \quad (4)$$

where, $\beta 4t$ denotes a magnification of the fourth lens group in a telephoto end state, and $\beta 4w$ denotes a magnification of the fourth lens group in a wide-angle end state.

The conditional expression (4) specifies, upon zooming from the wide-angle end state to the telephoto end state, a proper range of a magnification change ratio between the second lens group and the fourth lens group. In both cases where a value is more than or less than the specified range in the present conditional expression, the coma aberration or the astigmatism is deteriorated, and therefore such a case is not preferable.

In order to ensure the effect of the second embodiment of the present application, a lower limit in the conditional expression (4) is preferably adjusted to 0.40. In order to further ensure the effect of the second embodiment of the present application, the lower limit in the conditional expression (4) is preferably adjusted to 0.70. In order to still further ensure the effect of the second embodiment of the present application, the lower limit in the conditional expression (4) is preferably adjusted to 1.00. In order to ensure the effect of the second embodiment of the present application, an upper limit in the conditional expression (4) is preferably adjusted to 2.20. In order to further ensure the effect of the second embodiment of the present application, the upper limit in the conditional expression (4) is preferably adjusted to 2.00. In order to still further ensure the effect of the second embodiment of the present application, the upper limit in the conditional expression (4) is preferably adjusted to 1.80.

The zoom lens ZL according to the second embodiment of the present application preferably satisfies the following conditional expression (5):

$$1.50 < TLt/ft < 5.00 \quad (5)$$

where, TLt denotes a total length of the zoom lens in a telephoto end state, and ft denotes a focal length of the zoom lens as a whole in a telephoto end state.

The conditional expression (5) specifies a proper range of a ratio of the total length to the focal length in the telephoto end state. In both cases where a value is more than or less than the specified range in the present conditional expression, the spherical aberration, the coma aberration or the astigmatism is deteriorated, and therefore such a case is not preferable.

In order to ensure the effect of the second embodiment of the present application, a lower limit in the conditional expression (5) is preferably adjusted to 1.70. In order to further ensure the effect of the second embodiment of the present application, the lower limit in the conditional expression (5) is preferably adjusted to 1.90. In order to still further ensure the effect of the second embodiment of the present application, the lower limit in the conditional expression (5) is preferably adjusted to 2.10. In order to ensure the effect of the second embodiment of the present application, an upper limit in the conditional expression (5) is preferably adjusted to 4.60. In order to further ensure the effect of the second embodiment of the present application, the upper limit in the conditional expression (5) is preferably adjusted to 4.20. In order to still further ensure the effect of the second embodiment of the present application, the upper limit in the conditional expression (5) is preferably adjusted to 3.70.

The zoom lens according to the second embodiment of the present application preferably satisfies the following conditional expression (6):

$$28.0 < \omega w < 65.0 \quad (6)$$

where, $\omega w$ denotes a half angle of view (unit: degree) of the zoom lens as a whole in a wide-angle end state.

The conditional expression (6) is a conditional expression specifying an optimum value of the half angle of view in the wide-angle end state. Various aberrations such as the coma aberration, the curvature of field, and the distortion can be successfully corrected while having the wide half angle of view by satisfying the present conditional expression.

In order to ensure the effect of the second embodiment of the present application, a lower limit in the conditional expression (6) is preferably adjusted to 30.0. In order to further ensure the effect of the second embodiment of the present application, the lower limit in the conditional expression (6) is preferably adjusted to 32.0. In order to still further ensure the effect of the second embodiment of the present application, the lower limit in the conditional expression (6) is preferably adjusted to 35.0. In order to still further ensure the effect of the second embodiment of the present application, the lower limit in the conditional expression (6) is preferably adjusted to 38.0. In order to still further ensure the effect of the second embodiment of the present application, the lower limit in the conditional expression (6) is preferably adjusted to 40.0. In order to ensure the effect of the second embodiment of the present application, an upper limit in the conditional expression (6) is preferably adjusted to 60.0. In order to further ensure the effect of the second embodiment of the present application, the upper limit in the conditional expression (6) is preferably adjusted to 55.0. In order to still further ensure the effect of the second embodiment of the present application, the upper limit in the conditional expression (6) is preferably adjusted to 50.0. In order to still further ensure the effect of the second embodiment of the present application, the upper limit in the conditional expression (6) is preferably adjusted to 46.0.

The zoom lens according to the second embodiment of the present application desirably satisfies the following conditional expression (7):

$$5.0 < \omega t < 25.0 \quad (7)$$

where, ωt denotes a half angle of view (unit: degree) of the zoom lens as a whole in a telephoto end state.

The conditional expression (7) is a conditional expression specifying an optimum value of the half angle of view in the telephoto end state. Various aberrations such as the coma aberration, the curvature of field, and the distortion can be successfully corrected by satisfying the present conditional expression.

In order to ensure the effect of the second embodiment of the present application, a lower limit in the conditional expression (7) is preferably adjusted to 7.0. In order to further ensure the effect of the second embodiment of the present application, the lower limit in the conditional expression (7) is preferably adjusted to 9.0. In order to still further ensure the effect of the second embodiment of the present application, the lower limit in the conditional expression (7) is preferably adjusted to 10.0. In order to still further ensure the effect of the second embodiment of the present application, the lower limit in the conditional expression (7) is preferably adjusted to 12.0.

In order to ensure the effect of the second embodiment of the present application, an upper limit in the conditional expression (7) is preferably adjusted to 23.0. In order to further ensure the effect of the second embodiment of the present application, the upper limit in the conditional expression (7) is preferably adjusted to 21.0. In order to still further ensure the effect of the second embodiment of the present application, the upper limit in the conditional expression (7) is preferably adjusted to 19.0. In order to still further ensure the effect of the second embodiment of the present application, the upper limit in the conditional expression (7) is preferably adjusted to 17.0. In order to still further ensure the effect of the second embodiment of the present application, the upper limit in the conditional expression (7) is preferably adjusted to 16.0.

In the zoom lens ZL according to the second embodiment of the present application, at least part of the fourth lens group is preferably formed in a focusing lens. Accordingly, variations of various aberrations such as the spherical aberration, and the coma aberration upon focusing can be reduced. It should be noted that the zoom lens has a configuration in which, upon focusing from infinity to a short distance object, at least part of the fourth lens group constituting the focusing lens moves to an image in the optical axis direction.

In the zoom lens ZL according to the second embodiment of the present application, at least part of the third lens group preferably comprises a vibration-proof lens group having a displacement component in a direction perpendicular to an optical axis. Accordingly, variations of various aberrations such as the coma aberration upon correcting an image shake can be reduced.

The optical apparatus according to the second embodiment of the present application comprises the zoom lens ZL according to the second embodiment of the present application described above. As a specific example thereof, a camera 1 (optical apparatus) including the zoom lens ZL described above is a digital camera having the zoom lens ZL according to the second embodiment of the present application, as a photographing lens 2, in a configuration similar to the configuration of the camera shown in FIG. 9. The configuration is similar to the configuration of the camera having the zoom lens ZL according to the first embodiment of the present application, and therefore the detailed description is omitted.

According to the configuration described above, the camera 1 in which the zoom lens ZL according to the second embodiment of the present application described above is mounted as the photographing lens 2 is preferable for the video camera, the electronic still camera or the like using the solid state imaging device or the like, and the high magnification performance with the wide angle can be obtained while suppressing the size of the lens as a whole and maintaining the astigmatism and the chromatic aberration.

Figure 10:
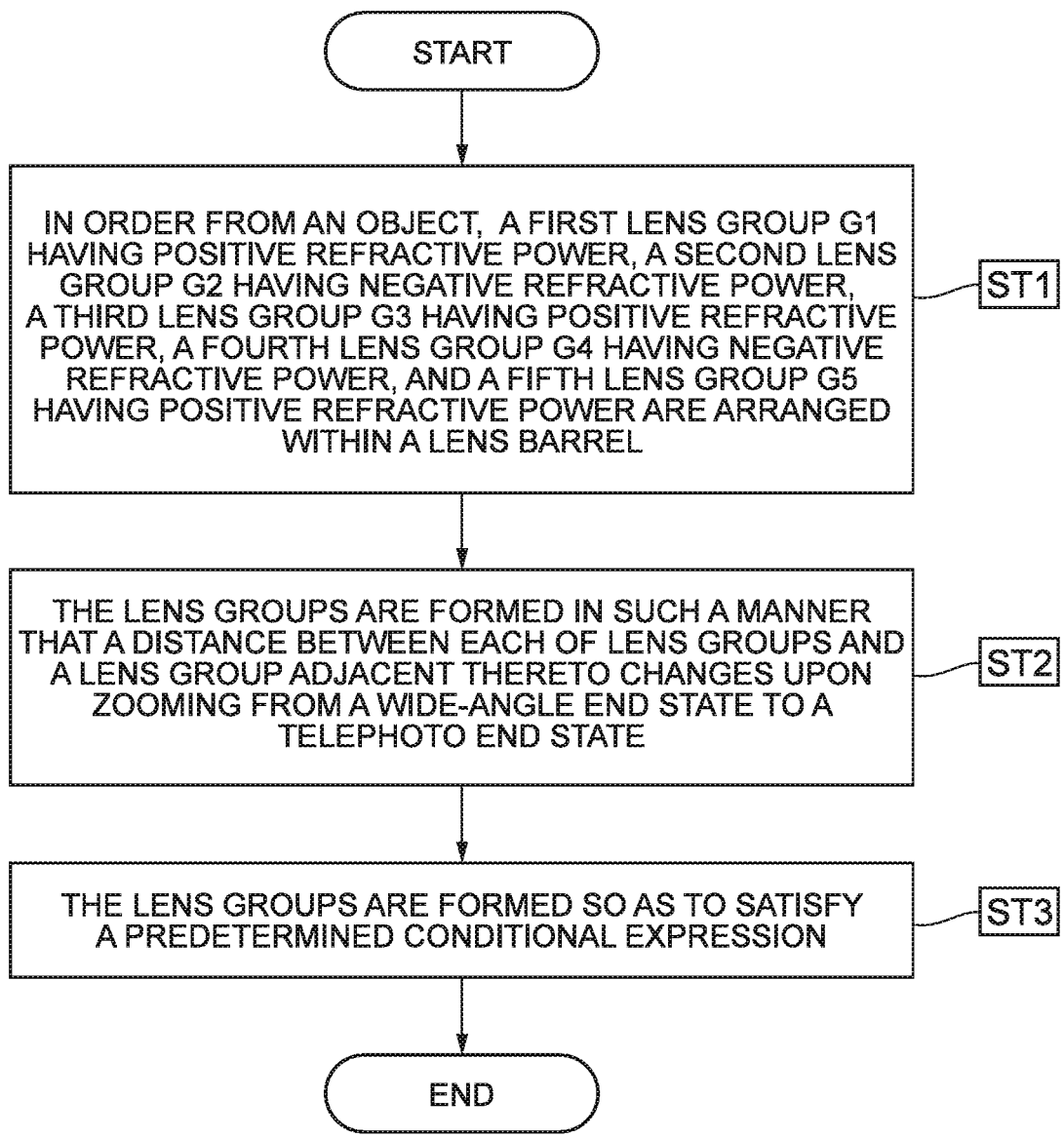
FIG. 10 is a flowchart showing an outline of a method for manufacturing a zoom lens according to the present embodiment.

Subsequently, a method for manufacturing the zoom lens ZL according to the second embodiment of the present application described above will be described with referring to FIG. 10. FIG. 10 has also been used for description of the manufacturing method according to the first embodiment of the present application, and the manufacturing method according to the second embodiment of the present application will be described also with reference of the drawing. First, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power are arranged within a lens barrel (step ST1). Next, the lens groups comprise in such a manner that, upon zooming from a wide-angle end state to a telephoto end state, a distance between each of lens groups G1 to G5 and a lens group adjacent thereto changes (step ST2). Further, the lens groups are configured so as to satisfy a predetermined conditional expression or the conditional expression (3) described above (step ST3).

According to the manufacturing method of the second embodiment of the present application, the zoom lens capable of successfully correcting various aberrations and having excellent optical performance with the wide angle and the large aperture can be manufactured.

EXAMPLES

Hereinafter, a zoom lens ZL according to Examples of first and second embodiments of the present application will be described with reference to drawings. FIGS. 1, 3, 5, and 7 each show a cross section showing a configuration or the like of zoom lenses ZL (ZL(1) to ZL(4)) each according to Examples 1 to 4. Arrows shown in lower parts of the drawings indicate moving directions of first to fifth lens groups G1 to G5 and aperture stops S, upon zooming (zooming operation) from a wide-angle end state to a telephoto end state.

It should be noted that the fourth lens group G4 is used as a focusing lens, and in the drawing, a moving direction when upon focusing on infinity to focusing on a short distance object is shown by an arrow together with a sign of "∞." Further, all or at least part of the third lens group G3 is used as a vibration-proof lens having a displacement component in a direction perpendicular to an optical axis.

In the drawings, each lens group is represented by a combination of a symbol G and a numeral, and each lens is represented by a combination of a symbol L and a numeral, respectively. In this case, in order to prevent complication due to an increase in kinds and the number of symbols and numerals, the lens group or the like is represented by using the combination of the symbol and the numeral for each Example, independently. Therefore, even if the combination of the same symbol and the same numeral is used among Examples, the combination does not mean the same configuration.

Tables 1 to 4 are shown below, each of which is a table showing specification data each in Examples 1 to 4.

In a table of "Lens Specifications," a surface number represents order of an optical surface from an object along a ray advancing direction, R denotes a radius of curvature of each optical surface (the surface on which a center of the radius of curvature is positioned on the image is applied as a positive value), D denotes a distance to the next lens surface being the distance from each optical surface to the next optical surface, nd denotes a refractive index of a material of an optical member relative to a d-line (wavelength: 587.6 nm), and νd denotes the Abbe number of the material of the optical member with the d-line as a reference, respectively. The surface number represents the order of the optical surface along the ray advancing direction from the object. A symbol "∞" in the radius of curvature indicates a flat surface or an aperture, and (Stop S) represents Aperture Stop S, respectively. The description of air refractive index nd=1.00000 is omitted. When the lens surface is aspherical, an asterisk "*" is placed on the surface number, and a paraxial radius of curvature is shown in a column of Radius of Curvature R.

A table of "Overall Specifications" shows specifications of the zoom lens as a whole, in which f denotes a focal length of a lens, Fno. denotes an F-number, and w denotes a half angle of view (maximum incident angle, unit: ° (degree)). BF denotes a distance (back focus) from a lens last surface to an image surface I on an optical axis upon focusing on infinity, and TL denotes a total lens length, and a distance obtained by adding BF to a distance from a lens forefront surface to a lens last surface. It should be noted that these values are shown for each in each zooming state of the wide-angle end state (Wide), the intermediate focal length state (Middle), and the telephoto end state (Tele).

A table of "Aspherical Data" shows a shape thereof according to the following formula (a) for the aspherical surface shown in "Lens Specifications." X(y) denotes a distance (sag amount) along an optical axis direction from a tangent plane at a vertex of the aspherical surface to a position on the aspherical surface at a height y, R denotes a radius of curvature (paraxial radius of curvature) of a reference spherical surface, κ denotes a conical coefficient, and Ai denotes an i-th aspherical coefficient. "E-n" represents "×10$^{-n}$." For example, "1.234E-05" represents "1.234×10$^{-5}$." It should be noted that a 2nd order aspherical coefficient A2 is 0, and the description thereof is omitted.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12} \quad (a)$$

A table of "Variable Distance Data" shows a distance to the next lens surface Di in the surface number i in which a distance to the next lens surface is described as "Variable" in the table showing "Lens Specifications." In Example 1, for example, distances to the next lens surfaces D3, D9, D19, D21, and D23 in the surface numbers 3, 9, 19, 21, and 23 are shown. Then, f denotes a focal length of the zoom lens.

A table of "Lens Group Data" shows a surface number of a group starting surface (surface closest to the object) in the first to the fourth (or fifth) lens groups, a focal length of each group, and a lens configuration length.

A table of "Conditional Expressions Corresponding Value" shows values corresponding to the conditional expressions (1) to (7) described above.

Hereinafter, unless otherwise specified, "mm" is generally used for a focal length f, a radius of curvature R, a surface distance D, any other length or the like listed in all specification values. However, even if an image is proportionally scaled in an optical system, optical performance equivalent to each other is obtained, and therefore the unit is not limited thereto.

As described above, matters common to all Examples are described, and the duplicate description in each Example in the following will be omitted.

Example 1

Example 1 will be described by using FIG. 1 and FIGS. 2A-2C, and Table 1. FIG. 1 shows a lens configuration of a zoom lens ZL(1) according to Example 1 of the present embodiment. The zoom lens ZL(1) comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. A sign (+) or (-) placed to a symbol of each lens group indicates refractive power of each lens group. A filter FL is provided in proximity to an image surface I on an image away from the fifth lens group G5. The filter FL is configured of a low-pass filter, an infrared cut filter, or the like. It should be noted that an aperture stop S is arranged in being positioned on the object from the third lens group G3. The aperture stop S is configured independently of the third lens group G3, but moves in an optical axis direction together with the third lens group G3.

As shown by arrows in FIG. 1, the first to the fifth lens groups G1 to G5 move, upon zooming, in an axis direction, respectively. Therefore, distances to the next lens surfaces D3, D9, D19, D21, and D23 are variable, and values thereof are shown in the table of "Variable Distance Data."

The first lens group G1 comprises a cemented lens consisted of, in order from the object, a negative meniscus lens L11 having a convex surface (the 1st surface) facing the object, and a positive meniscus lens L12 having a convex surface facing the object.

The second lens group G2 consists of, in order from the object, a negative meniscus lens L21 having a convex surface facing the object, a biconcave negative lens L22, and a positive meniscus lens L23 having a convex surface facing the object. It should be noted that both side surfaces of the negative meniscus lens L21 are aspherical.

The third lens group G3 consists of, in order from the object, a biconcave positive lens L31, a negative meniscus lens L32 having a convex surface facing the object, a cemented lens formed of a biconcave negative lens L33 and a biconvex positive lens L34, and a biconvex positive lens L35. It should be noted that both side surfaces of the positive lens L31 are aspherical.

The fourth lens group G4 consists of a negative meniscus lens L41 having a convex surface facing the object.

The fifth lens group G5 consists of a positive meniscus lens L51 having a convex surface facing the object. It should be noted that a surface of the positive meniscus lens L51 on the object is aspherical.

In the zoom lens ZL(1), focusing from infinity (long distance object) to a short distance object is performed by moving the fourth lens group G4 in an image surface direction. Further, all or at least part (may be either the third lens group G3 as a whole, or any one of the lenses L31 to L35 forming the lens group G3 or a combination thereof) of the third lens group G3 comprises a vibration-proof lens group having a displacement component in a direction perpendicular to an optical axis to perform image blur correction (vibration-proofing or image shake correction) on the image surface I.

Table 1 below lists specification values of an optical system according to Example 1.

TABLE 1

| [Lens Data] | | | | |
|---|---|---|---|---|
| | R | D | nd | νd |
| 1 | 39.599 | 0.940 | 1.9459 | 18.0 |
| 2 | 28.320 | 5.372 | 1.8348 | 42.7 |
| 3 | 161.160 | (Variable) | | |
| 4* | 121.431 | 1.074 | 1.7738 | 47.2 |
| 5* | 11.074 | 6.715 | | |
| 6 | −34.223 | 0.672 | 1.6968 | 55.5 |
| 7 | 76.259 | 0.134 | | |
| 8 | 30.756 | 2.283 | 1.9459 | 18.0 |
| 9 | 284.646 | (Variable) | | |
| 10 | ∞ | 1.343 | (Stop S) | |
| 11* | 14.154 | 3.828 | 1.8208 | 42.7 |
| 12* | −49.429 | 0.134 | | |
| 13 | 36.789 | 0.940 | 1.6666 | 30.4 |
| 14 | 11.416 | 3.895 | | |
| 15 | −16.584 | 0.672 | 1.9962 | 28.3 |
| 16 | 32.543 | 3.828 | 1.5928 | 68.6 |
| 17 | −15.861 | 0.134 | | |
| 18 | 142.462 | 3.022 | 1.8040 | 46.6 |
| 19 | −19.075 | (Variable) | | |
| 20 | 168.862 | 0.672 | 1.6968 | 55.5 |
| 21 | 39.344 | (Variable) | | |
| 22* | 30.318 | 2.619 | 1.7725 | 49.5 |
| 23 | 87.295 | (Variable) | | |
| 24 | ∞ | 3.700 | 1.5168 | 63.9 |
| 25 | ∞ | (BF) | | |
| Image Surface | ∞ | | | |

| [Overall Specifications] | | | |
|---|---|---|---|
| | Wide | Middle | Tele |
| f | 12.2 | 22.3 | 40.7 |
| Aperture Stop Diameter | 13.9 | 13.1 | 13.1 |
| Fno. | 1.9 | 2.4 | 2.8 |
| ω | 43.5 | 26.4 | 14.4 |
| BF | 0.99 | 0.99 | 0.99 |
| Air Equivalent BF | 15.70 | 8.75 | 7.19 |
| TL | 82.94 | 83.68 | 100.11 |
| Air Equivalent TL | 81.68 | 82.42 | 98.85 |

| [Aspherical Data] | | | | | | |
|---|---|---|---|---|---|---|
| | κ | A4 | A6 | A8 | A10 | A12 |
| The 4th Surface | 1 | −2.808E−05 | 2.147E−07 | −7.556E−10 | −2.372E−13 | 5.361E−15 |
| The 5th Surface | 1.052 | −6.407E−05 | −1.124E−08 | −8.523E−09 | 1.324E−10 | −1.141E−12 |
| The 11th Surface | 0.026 | 1.201E−05 | 1.731E−07 | 0.000E+00 | 0.000E+00 | 0.000E+00 |
| The 12th Surface | 1 | 7.117E−05 | −9.785E−08 | 0.000E+00 | 0.000E+00 | 0.000E+00 |
| The 22nd Surface | 1 | −7.376E−06 | 5.901E−08 | −4.201E−10 | 1.361E−12 | 0.000E+00 |

| [Variable Distance Data] | | | |
|---|---|---|---|
| | Wide | Middle | Tele |
| f | 12.2 | 22.3 | 40.7 |
| D3 | 0.935 | 6.724 | 19.177 |
| D9 | 18.862 | 6.399 | 2.131 |
| D19 | 2.015 | 10.154 | 4.509 |
| D21 | 5.889 | 12.125 | 27.566 |
| D23 | 12.274 | 5.321 | 3.761 |

TABLE 1-continued

[Zoom Lens Group Data]

| Group Number | Group Starting Surface | Group Focal Length | Lens Configuration Length |
|---|---|---|---|
| G1 | 1 | 65.8 | 6.31 |
| G2 | 4 | −15.3 | 9.54 |
| G3 | 11 | 20.5 | 17.79 |
| G4 | 20 | −73.8 | 0.67 |
| G5 | 22 | 58.9 | 2.62 |

[Conditional Expression Corresponding Value]

Conditional Expression (1) |MV5/MV2| = 7.94
Conditional Expression (2) β2t/β2w = 1.70
Conditional Expression (3) |MV4/MV2| = 12.28
Conditional Expression (4) (β2t × β4w)/(β2w × β4t) = 1.59
Conditional Expression (5) TLt/ft = 2.46
Conditional Expression (6) ωw = 43.5
Conditional Expression (7) ωt = 14.4

As shown in the table of "Conditional Expression Corresponding Value" described above, the zoom lens ZL(1) shown in FIG. 1 according to Example 1 satisfies all the conditional expressions (1) to (7) described above.

Figure 2B:
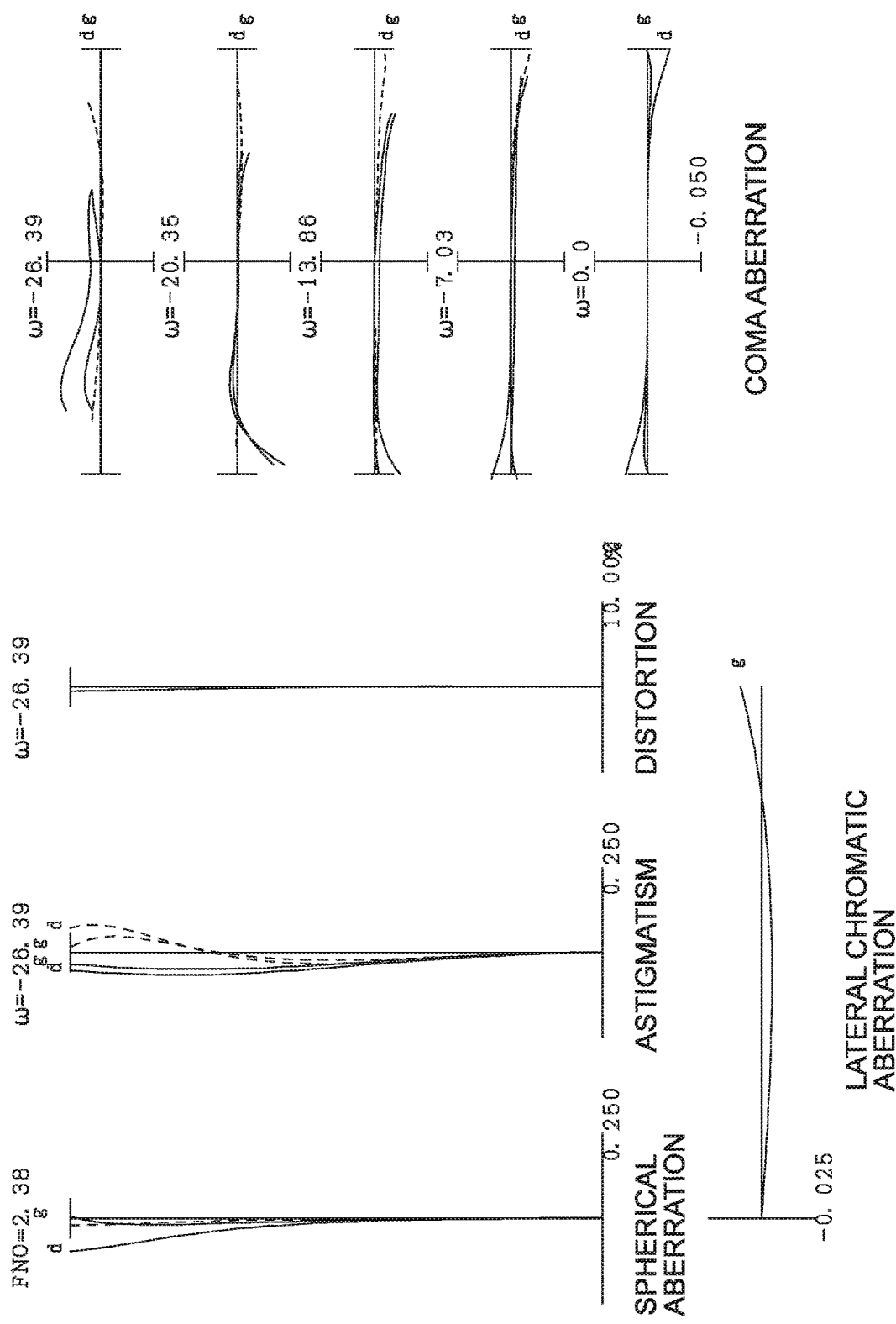

FIGS. 2A, 2B, and 2C each show various aberrations of the zoom lens ZL(1) upon focusing on infinity in the wide-angle end state, in the intermediate focal length state, and in the telephoto end state. As seen from graphs showing various aberrations each, it is found that the zoom lens ZL(1) according to Example 1 successfully corrects various aberrations from the wide-angle end state to the telephoto end state to have excellent imaging performance. It should be noted that distortion can be corrected by imaging processing after imaging to require no optical correction.

In FIGS. 2A-2C, FNO denotes an F-number, a denotes a half angle of view (unit: °) relative to each image height, and d denotes an aberration of d-line (λ=587.6 nm), and g denotes an aberration of g-line (λ=435.8 nm), respectively. In graphs showing a spherical aberration, astigmatism, and a coma aberration, a solid line indicates an aberration of a sagittal image surface, and a broken line indicates an aberration of a meridional image surface. The present description is similar to all the graphs showing aberrations in each Example below, and the duplicate description in the following will be omitted.

Example 2

Example 2 will be described by using FIG. 3 and FIGS. 4A-4C, and Table 2. FIG. 3 shows a lens configuration of a zoom lens ZL(2) according to Example 2 of the present embodiment. The zoom lens ZL(2) comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. A filter FL is provided in proximity to an image surface I on an image away from the fifth lens group G5. An aperture stop S is arranged in being positioned on the object from the third lens group G3. The aperture stop S is configured independently of the third lens group G3, but moves in an optical axis direction together with the third lens group G3.

As shown by arrows in FIG. 3, the first to the fifth lens groups G1 to G5 move, upon zooming, in an axis direction, respectively. Therefore, distances to the next lens surfaces D3, D9, D19, D21, and D23 are variable, and values thereof are shown in the table of "Variable Distance Data."

The first lens group G1 consists of a cemented lens formed of, in order from the object, a negative meniscus lens L11 having a convex surface (the 1st surface) facing the object, and a positive meniscus lens L12 having a convex surface facing the object.

The second lens group G2 consists of, in order from the object, a negative meniscus lens L21 having a convex surface facing the object, a biconcave negative lens L22, and a positive meniscus lens L23 having a convex surface facing the object. It should be noted that both side surfaces of the negative meniscus lens L21 are aspherical.

The third lens group G3 consists of, in order from the object, a biconvex positive lens L31, a negative meniscus lens L32 having a convex surface facing the object, a cemented lens formed of a biconcave negative lens L33 and a biconvex positive lens L34, and a biconvex positive lens L35. It should be noted that both side surfaces of the positive lens L31 and the positive lens L35 are aspherical.

The fourth lens group G4 consists of a biconcave negative lens L41.

The fifth lens group G5 consists of a positive meniscus lens L51 having a convex surface facing the object. It should be noted that a surface of the positive meniscus lens L51 on the object is aspherical.

In the zoom lens ZL(2), focusing from infinity (long distance object) to a short distance object is performed by moving the fourth lens group G4 in an image surface direction. Further, all or at least part of the third lens group G3 comprises a vibration-proof lens group having a displacement component in a direction perpendicular to an optical axis to perform image blur correction (vibration-proofing or image shake correction) on the image surface I.

Table 2 below lists specification values of an optical system according to Example 2.

TABLE 2

| [Lens Data] | | | | |
|---|---|---|---|---|
| | R | D | nd | νd |
| 1 | 36.635 | 1.074 | 1.9460 | 18.0 |
| 2 | 28.013 | 5.372 | 1.8040 | 46.6 |
| 3 | 114.144 | (Variable) | | |
| 4* | 87.223 | 1.074 | 1.8514 | 40.1 |
| 5* | 11.136 | 6.849 | | |
| 6 | −42.800 | 0.672 | 1.6968 | 55.5 |
| 7 | 58.836 | 0.134 | | |
| 8 | 29.612 | 2.552 | 2.0027 | 19.3 |
| 9 | 677.090 | (Variable) | | |
| 10 | ∞ | 1.343 | (Stop S) | |
| 11* | 14.440 | 3.760 | 1.7433 | 49.3 |
| 12* | −172.482 | 0.134 | | |
| 13 | 13.667 | 2.283 | 1.7950 | 28.7 |
| 14 | 9.434 | 3.358 | | |
| 15 | −17.037 | 0.672 | 1.7552 | 27.6 |
| 16 | 13.246 | 3.492 | 1.4970 | 81.7 |
| 17 | −55.668 | 0.134 | | |
| 18* | 28.527 | 3.358 | 1.7725 | 49.6 |
| 19* | −16.687 | (Variable) | | |
| 20 | −131.120 | 0.806 | 1.6030 | 65.4 |
| 21 | 32.989 | (Variable) | | |
| 22* | 25.536 | 4.029 | 1.6935 | 53.2 |
| 23 | 277.466 | (Variable) | | |
| 24 | ∞ | 1.350 | 1.5168 | 63.9 |
| 25 | ∞ | (BF) | | |
| Image Surface | ∞ | | | |

| [Overall Specifications] | | | |
|---|---|---|---|
| | Wide | Middle | Tele |
| f | 12.2 | 22.3 | 40.7 |
| Aperture Stop Diameter | 13.6 | 10.8 | 12.9 |
| Fno. | 1.9 | 2.9 | 2.9 |
| ω | 42.6 | 26.1 | 14.4 |
| BF | 2.54 | 2.54 | 2.54 |
| Air Equivalent BF | 12.08 | 7.23 | 6.54 |
| TL | 80.65 | 81.66 | 98.48 |
| Air Equivalent TL | 80.19 | 81.20 | 98.02 |

| [Aspherical Data] | | | | | | |
|---|---|---|---|---|---|---|
| | κ | A4 | A6 | A8 | A10 | A12 |
| The 4th Surface | 1 | −2.244E−05 | 2.093E−08 | 1.088E−09 | −7.741E−12 | 1.640E−14 |
| The 5th Surface | 0.957 | −5.462E−05 | −1.346E−07 | −7.444E−09 | 1.180E−10 | −8.246E−13 |
| The 11th Surface | 1.121 | −3.990E−05 | −1.142E−07 | 0.000E+00 | 0.000E+00 | 0.000E+00 |
| The 12th Surface | 1 | −7.117E−06 | 1.245E−07 | 0.000E+00 | 0.000E+00 | 0.000E+00 |
| The 18th Surface | 1 | −4.823E−05 | 1.325E−07 | 0.000E+00 | 0.000E+00 | 0.000E+00 |
| The 19th Surface | 1 | 1.580E−05 | −6.115E−08 | 0.000E+00 | 0.000E+00 | 0.000E+00 |
| The 22nd Surface | 1 | −8.610E−06 | 9.380E−08 | −5.728E−10 | 1.509E−12 | 0.000E+00 |

TABLE 2-continued

[Variable Distance Data]

|  | Wide | Middle | Tele |
|---|---|---|---|
| f | 12.2 | 22.3 | 40.7 |
| D3 | 0.824 | 7.259 | 20.119 |
| D9 | 19.217 | 6.624 | 2.015 |
| D19 | 2.015 | 6.335 | 2.952 |
| D21 | 4.966 | 12.657 | 25.303 |
| D23 | 8.650 | 3.800 | 3.114 |

[Zoom Lens Group Data]

| Group Number | Group Starting Surface | Group Focal Length | Lens Configuration Length |
|---|---|---|---|
| G1 | 1 | 69.8 | 6.45 |
| G2 | 4 | −16.9 | 11.28 |
| G3 | 11 | 19.7 | 17.19 |
| G4 | 20 | −43.6 | 0.81 |
| G5 | 22 | 40.3 | 4.03 |

[Conditional Expression Corresponding Value]

Conditional Expression (1) |MV5/MV2| = 3.78
Conditional Expression (2) β2t/β2w = 1.70
Conditional Expression (3) |MV4/MV2| = 10.10
Conditional Expression (4) (β2t × β4w)/(β2w × β4t) = 1.51
Conditional Expression (5) TLt/ft = 2.42
Conditional Expression (6) ωw = 42.6
Conditional Expression (7) ωt = 14.4

As shown in the table of "Conditional Expression Corresponding Value" described above, the zoom lens ZL(2) shown in FIG. 3 according to Example 2 satisfies all the conditional expressions (1) to (7) described above.

Figure 4B:
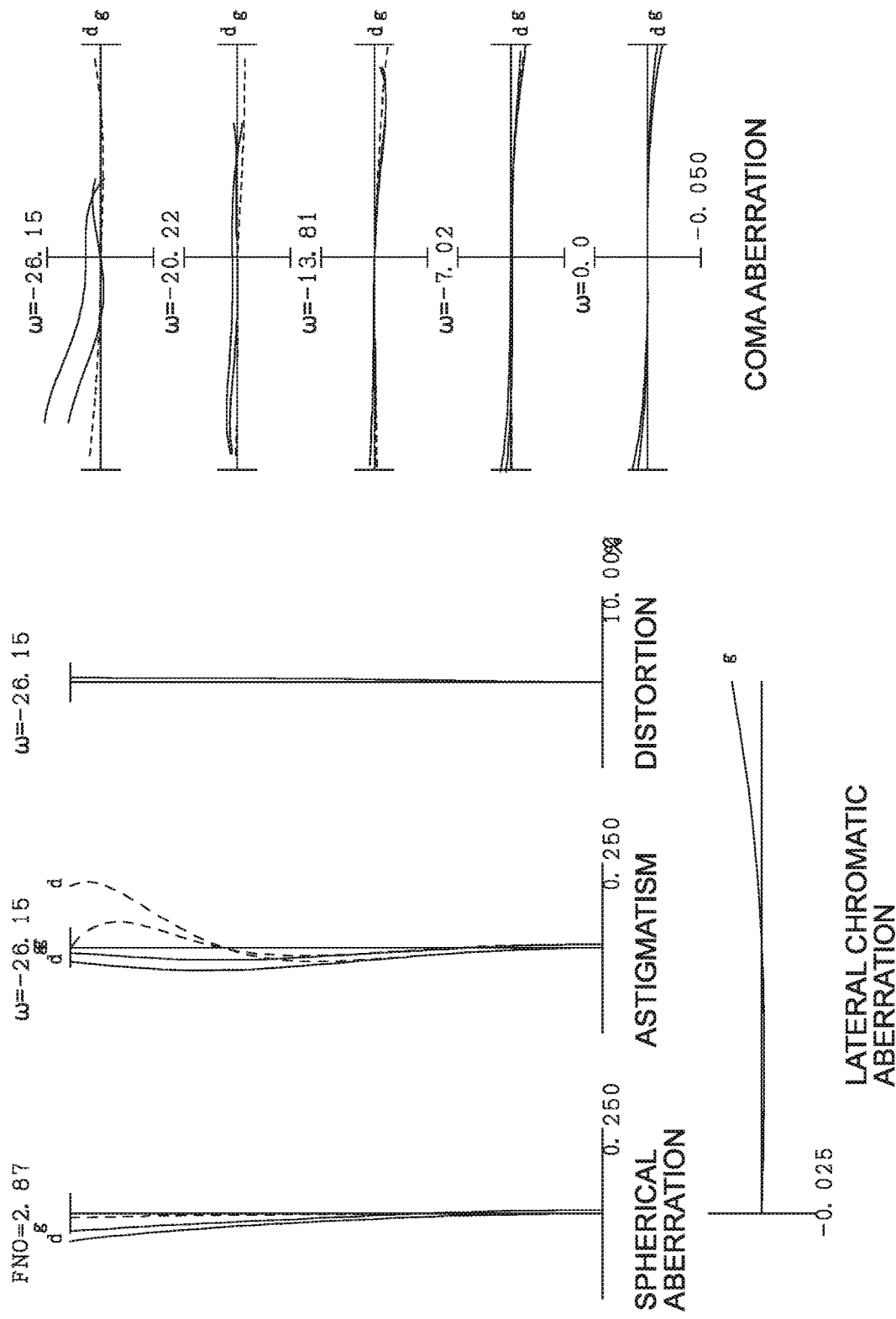

FIGS. 4A, 4B, and 4C each show various aberrations of the zoom lens ZL(2) according to Example 2 upon focusing on infinity in the wide-angle end state, in the intermediate focal length state, and in the telephoto end state. As seen from graphs showing various aberrations each, the zoom lens ZL(2) according to Example 2 successfully corrects various aberrations from the wide-angle end state to the telephoto end state to have excellent imaging performance.

Example 3

Example 3 will be described by using FIG. 5 and FIGS. 6A-6C, and Table 3. FIG. 5 shows a lens configuration of a zoom lens ZL(3) according to Example 3 of the present embodiment. The zoom lens ZL(3) comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. A filter FL is provided in proximity to an image surface I on an image away from the fifth lens group G5. It should be noted that an aperture stop S is arranged in being positioned on the object from the third lens group G3. The aperture stop S is configured independently of the third lens group G3, but moves in an optical axis direction together with the third lens group G3.

As shown by arrows in FIG. 5, the first to the fifth lens groups G1 to G5 move, upon zooming, in an axis direction, respectively. Therefore, distances to the next lens surfaces D3, D9, D19, D21, and D23 are variable, and values thereof are shown in the table of "Variable Distance Data."

The first lens group G1 consists of a cemented lens formed of, in order from the object, a negative meniscus lens L11 having a convex surface (the 1st surface) facing the object, and a positive meniscus lens L12 having a convex surface facing the object.

The second lens group G2 consists of, in order from the object, a negative meniscus lens L21 having a convex surface facing the object, a biconcave negative lens L22, and a positive meniscus lens L23 having a convex surface facing the object. It should be noted that both side surfaces of the negative meniscus lens L21 are aspherical.

The third lens group G3 consists of, in order from the object, a biconvex positive lens L31, a negative meniscus lens L32 having a convex surface facing the object, a cemented lens formed of a biconcave negative lens L33 and a biconvex positive lens L34, and a biconvex positive lens L35. It should be noted that both side surfaces of the positive lens L31 and the positive lens L35 are aspherical.

The fourth lens group G4 consists of a biconcave negative lens L41.

The fifth lens group G5 consists of a positive meniscus lens L51 having a convex surface facing the object. It should be noted that a surface of the positive meniscus lens L51 on the object is aspherical.

In the zoom lens ZL(3), focusing from infinity (long distance object) to a short distance object is performed by moving the fourth lens group G4 in an image surface direction. Further, all or at least part of the third lens group G3 comprises a vibration-proof lens group having a displacement component in a direction perpendicular to an optical axis to perform image blur correction (vibration-proofing or image shake correction) on the image surface I.

Table 3 below lists specification values of an optical system according to Example 3.

TABLE 3

[Lens Data]

| | R | D | nd | νd |
|---|---|---|---|---|
| 1 | 35.049 | 1.074 | 2.0027 | 19.3 |
| 2 | 25.373 | 5.641 | 1.8348 | 42.7 |
| 3 | 110.958 | (Variable) | | |
| 4* | 188.807 | 1.074 | 1.7738 | 47.2 |
| 5* | 10.397 | 6.446 | | |
| 6 | −39.303 | 0.672 | 1.6968 | 55.5 |
| 7 | 55.370 | 0.134 | | |
| 8 | 29.024 | 2.485 | 2.0027 | 19.3 |
| 9 | 1027.710 | (Variable) | | |
| 10 | ∞ | 1.343 | (Stop S) | |
| 11* | 13.928 | 3.492 | 1.7433 | 49.3 |
| 12* | −96.886 | 0.134 | | |
| 13 | 15.453 | 1.209 | 1.8081 | 22.7 |
| 14 | 10.080 | 3.895 | | |
| 15 | −13.665 | 0.672 | 2.0010 | 29.1 |
| 16 | 53.442 | 2.887 | 1.4970 | 81.7 |
| 17 | −19.734 | 0.134 | | |
| 18* | 55.578 | 3.828 | 1.7725 | 49.5 |
| 19* | −14.278 | (Variable) | | |
| 20 | −5325.655 | 0.806 | 1.6030 | 65.4 |
| 21 | 35.704 | (Variable) | | |
| 22* | 27.530 | 3.358 | 1.6935 | 53.2 |
| 23 | 158.402 | (Variable) | | |
| 24 | ∞ | 3.210 | 1.5168 | 63.9 |
| 25 | ∞ | (BF) | | |
| Image Surface | ∞ | | | |

[Overall Specifications]

| | Wide | Middle | Tele |
|---|---|---|---|
| f | 12.2 | 22.3 | 40.7 |
| Aperture Stop Diameter | 13.4 | 10.6 | 13.4 |
| Fno. | 1.9 | 2.9 | 2.8 |
| ω | 42.6 | 26.1 | 14.4 |
| BF | 1.31 | 1.31 | 1.31 |
| Air Equivalent BF | 15.72 | 7.18 | 5.78 |
| TL | 82.18 | 83.99 | 101.28 |
| Air Equivalent TL | 81.08 | 82.90 | 100.19 |

[Aspherical Data]

| | κ | A4 | A6 | A8 | A10 | A12 |
|---|---|---|---|---|---|---|
| The 4th Surface | 1 | −1.006E−05 | −1.100E−07 | 2.367E−09 | −1.481E−11 | 3.218E−14 |
| The 5th Surface | 0.983 | −5.867E−05 | −1.605E−07 | −1.814E−08 | 3.047E−10 | −2.240E−12 |
| The 11th Surface | −1.173 | 5.293E−05 | −1.532E−07 | 0.000E+00 | 0.000E+00 | 0.000E+00 |
| The 12th Surface | 1 | −2.009E−06 | 9.410E−08 | 0.000E+00 | 0.000E+00 | 0.000E+00 |
| The 18th Surface | 1 | −4.273E−05 | 7.466E−08 | 0.000E+00 | 0.000E+00 | 0.000E+00 |
| The 19th Surface | 1 | 2.000E−05 | 3.680E−09 | 0.000E+00 | 0.000E+00 | 0.000E+00 |
| The 22nd Surface | 1 | −6.307E−06 | 4.267E−08 | −3.049E−10 | 1.360E−12 | 0.000E+00 |

[Variable Distance Data]

| | Wide | Middle | Tele |
|---|---|---|---|
| f | 12.2 | 22.3 | 40.7 |
| D3 | 1.235 | 7.127 | 19.303 |
| D9 | 17.677 | 6.273 | 2.594 |
| D19 | 2.015 | 10.446 | 4.847 |

TABLE 3-continued

| | | | |
|---|---|---|---|
| D21 | 5.150 | 12.586 | 28.387 |
| D23 | 12.296 | 3.753 | 2.349 |

[Zoom Lens Group Data]

| Group Number | Group Starting Surface | Group Focal Length | Lens Configuration Length |
|---|---|---|---|
| G1 | 1 | 65.8 | 6.72 |
| G2 | 4 | −15.6 | 10.81 |
| G3 | 11 | 20.4 | 17.59 |
| G4 | 20 | −58.8 | 0.81 |
| G5 | 22 | 47.5 | 3.36 |

[Conditional Expression Corresponding Value]

Conditional Expression (1) |MV5/MV2| = 9.57
Conditional Expression (2) β2t/β2w = 1.71
Conditional Expression (3) |MV4/MV2| = 12.78
Conditional Expression (4) (β2t × β4w)/(β2w × β4t) = 1.64
Conditional Expression (5) TLt/ft = 2.49
Conditional Expression (6) ωw = 42.6
Conditional Expression (7) ωt = 14.4

As shown in the table of "Conditional Expression Corresponding Value" described above, the zoom lens ZL(3) shown in FIG. 5 according to Example 3 satisfies all the conditional expressions (1) to (7) described above.

Figure 6C:
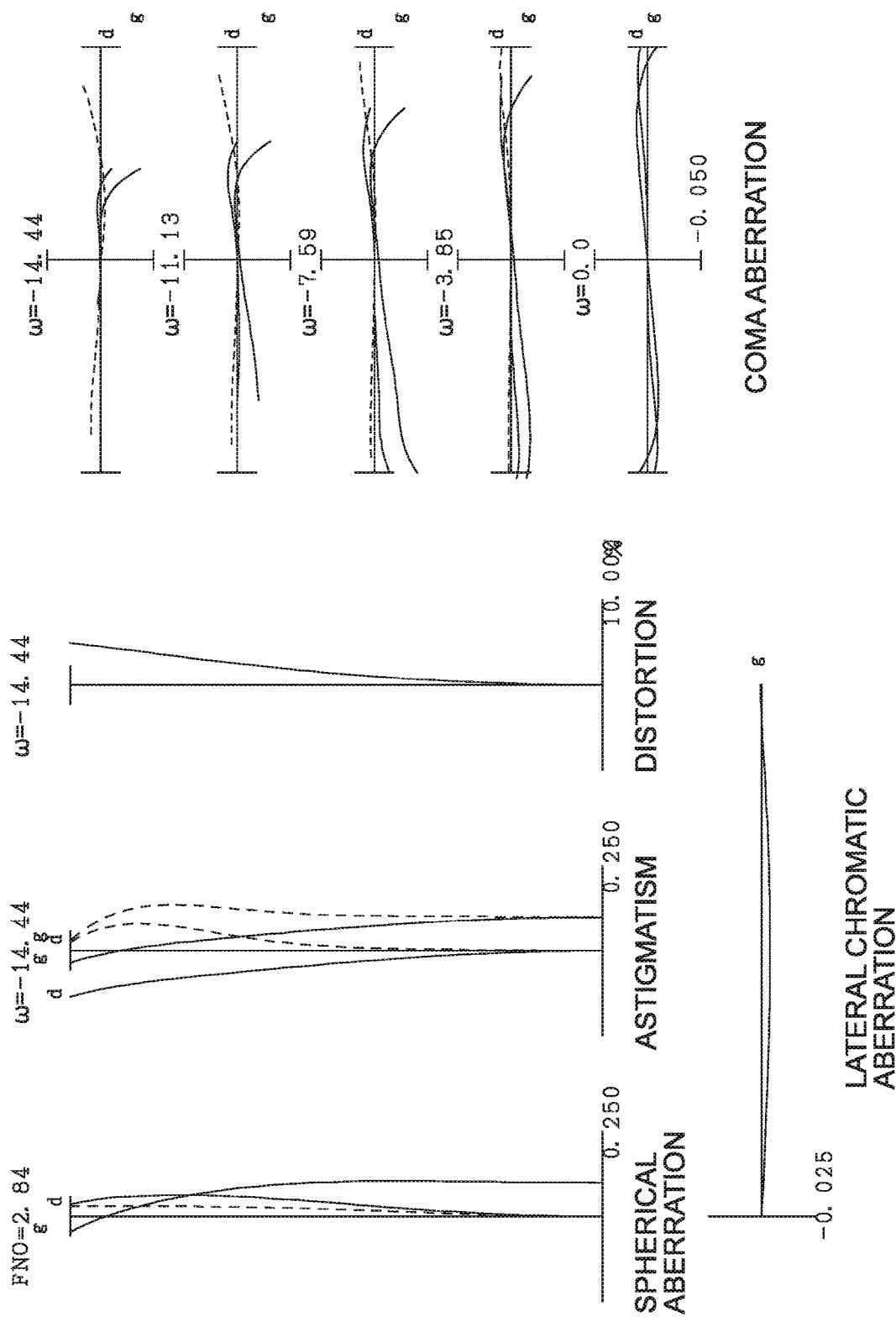

FIGS. 6A, 6B, and 6C each show various aberrations of the zoom lens ZL(3) according to Example 3 upon focusing on infinity in the wide-angle end state, in the intermediate focal length state, and in the telephoto end state. As seen from graphs showing various aberrations each, the zoom lens ZL(3) according to Example 3 successfully corrects various aberrations from the wide-angle end state to the telephoto end state to have excellent imaging performance.

Example 4

Example 4 will be described by using FIG. 7 and FIGS. 8A-8C, and Table 4. FIG. 7 shows a lens configuration of a zoom lens ZL(4) according to Example 4 of the present embodiment. The zoom lens ZL(4) comprises, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. A filter FL is provided in proximity to an image surface I on an image away from the fifth lens group G5. It should be noted that an aperture stop S is arranged inside the third lens group G3.

As shown by arrows in FIG. 7, the first to the fifth lens groups G1 to G5 move, upon zooming, in an axis direction, respectively. Therefore, distances to the next lens surfaces D3, D9, D19, D21, and D24 are variable, and values thereof are shown in the table of "Variable Distance Data."

The first lens group G1 consists of a cemented lens formed of, in order from the object, a negative meniscus lens L11 having a convex surface facing the object, and a positive meniscus lens L12 having a convex surface facing the object.

The second lens group G2 consists of, in order from the object, a negative meniscus lens L21 having a convex surface facing the object, a biconcave negative lens L22, and a biconvex positive lens L23. It should be noted that both side surfaces of the negative meniscus lens L21 are aspherical.

The third lens group G3 consists of, in order from the object, a biconvex positive lens L31, a negative meniscus lens L32 having a convex surface facing the object, a cemented lens formed of a biconcave negative lens L33 and a biconvex positive lens L34, and a biconvex positive lens L35. It should be noted that both side surfaces of the positive lens L31 and the positive lens L35 are aspherical.

The fourth lens group G4 consists of a negative meniscus lens L41 having a convex surface facing the object.

The fifth lens group G5 consists of, in order from the object, a biconvex positive lens L51, and a negative meniscus lens L52 having a convex surface facing the image.

In the zoom lens ZL(4), focusing from infinity (long distance object) to a short distance object is performed by moving the fourth lens group G4 in an image surface direction. Further, all or at least part of the third lens group G3 comprises a vibration-proof lens group having a displacement component in a direction perpendicular to an optical axis to perform image blur correction (vibration-proofing or image shake correction) on the image surface I.

Table 4 below lists specification values of an optical system according to Example 4.

TABLE 4

[Lens Data]

| | R | D | nd | νd |
|---|---|---|---|---|
| 1 | 51.721 | 2.015 | 1.8467 | 23.8 |
| 2 | 40.614 | 7.055 | 1.6030 | 65.4 |
| 3 | 730.595 | (Variable) | | |
| 4* | 366.053 | 2.015 | 1.7725 | 49.5 |
| 5* | 15.152 | 9.651 | | |

TABLE 4-continued

| | | | | |
|---|---|---|---|---|
| 6 | −33.575 | 1.343 | 1.6030 | 65.4 |
| 7 | 5551.208 | 0.271 | | |
| 8 | 52.110 | 2.820 | 1.8467 | 23.8 |
| 9 | −4156.714 | (Variable) | | |
| 10* | 23.190 | 5.883 | 1.7725 | 49.5 |
| 11* | −75.540 | 2.015 | | |
| 12 | ∞ | 2.015 | (Stop S) | |
| 13 | 118.818 | 0.940 | 1.7380 | 32.3 |
| 14 | 19.813 | 5.874 | | |
| 15 | −14.724 | 0.940 | 1.7380 | 32.3 |
| 16 | 33.575 | 6.464 | 1.8040 | 46.6 |
| 17 | −21.843 | 0.134 | | |
| 18* | 29.197 | 5.666 | 1.5533 | 71.7 |
| 19* | −30.869 | (Variable) | | |
| 20 | 83.361 | 1.343 | 1.4875 | 70.1 |
| 21 | 28.987 | (Variable) | | |
| 22 | 29.079 | 6.044 | 1.6030 | 65.4 |
| 23 | −42.616 | 1.074 | 1.8467 | 23.8 |
| 24 | −594.734 | (Variable) | | |
| 25 | ∞ | 1.500 | 1.5168 | 63.8 |
| 26 | ∞ | (BF) | | |
| Image Surface | ∞ | | | |

[Overall Specifications]

| | Wide | Middle | Tele |
|---|---|---|---|
| f | 12.2 | 22.2 | 40.6 |
| Aperture Stop Diameter | 18.6 | 18.6 | 18.6 |
| Fno. | 1.4 | 1.7 | 2.2 |
| ω | 42.8 | 26.7 | 14.5 |
| BF | 1.69 | 1.69 | 1.69 |
| Air Equivalent BF | 12.92 | 9.00 | 4.69 |
| TL | 114.12 | 111.74 | 135.04 |
| Air Equivalent TL | 113.61 | 111.23 | 134.53 |

[Aspherical Data]

| | κ | A4 | A6 | A8 | A10 |
|---|---|---|---|---|---|
| The 4th Surface | 1 | −1.006E−05 | −1.100E−07 | 2.367E−09 | −1.481E−11 |
| The 5th Surface | 0.983 | −5.867E−05 | −1.605E−07 | −1.814E−08 | 3.047E−10 |
| The 10th Surface | −1.173 | 5.293E−05 | −1.532E−07 | 0.000E+00 | 0.000E+00 |
| The 11th Surface | 1 | −2.009E−06 | 9.410E−08 | 0.000E+00 | 0.000E+00 |
| The 18th Surface | 1 | −4.273E−05 | 7.466E−08 | 0.000E+00 | 0.000E+00 |
| The 19th Surface | 1 | 2.000E−05 | 3.680E−09 | 0.000E+00 | 0.000E+00 |

[Variable Distance Data]

| | Wide | Middle | Tele |
|---|---|---|---|
| f | 12.2 | 22.2 | 40.6 |
| D3 | 0.537 | 9.250 | 23.503 |
| D9 | 27.283 | 6.864 | 0.672 |
| D19 | 1.672 | 8.741 | 1.637 |
| D21 | 7.632 | 13.813 | 40.473 |
| D24 | 10.249 | 6.327 | 2.015 |

[Zoom Lens Group Data]

| Group Number | Group Starting Surface | Group Focal Length | Lens Configuration Length |
|---|---|---|---|
| G1 | 1 | 103.0 | 9.07 |
| G2 | 4 | −20.1 | 16.10 |
| G3 | 10 | 28.0 | 29.93 |

TABLE 4-continued

| G4 | 20 | −91.9 | 1.34 |
|----|----|-------|------|
| G5 | 22 | 59.6  | 7.12 |

[Conditional Expression Corresponding Value]

Conditional Expression (1) $|MV5/MV2| = 4.04$
Conditional Expression (2) $\beta 2t/\beta 2w = 1.44$
Conditional Expression (3) $|MV4/MV2| = 12.07$
Conditional Expression (4) $(\beta 2t \times \beta 4w)/(\beta 2w \times \beta 4t) = 1.25$
Conditional Expression (5) $TLt/ft = 3.32$
Conditional Expression (6) $\omega w = 42.8$
Conditional Expression (7) $\omega t = 14.5$ As shown in the table of "Conditional Expression Corresponding Value" described above, the zoom lens ZL(4) shown in FIG. 7 according to Example 4 satisfies all the conditional expressions (1) to (7) described above.

Figure 8B:
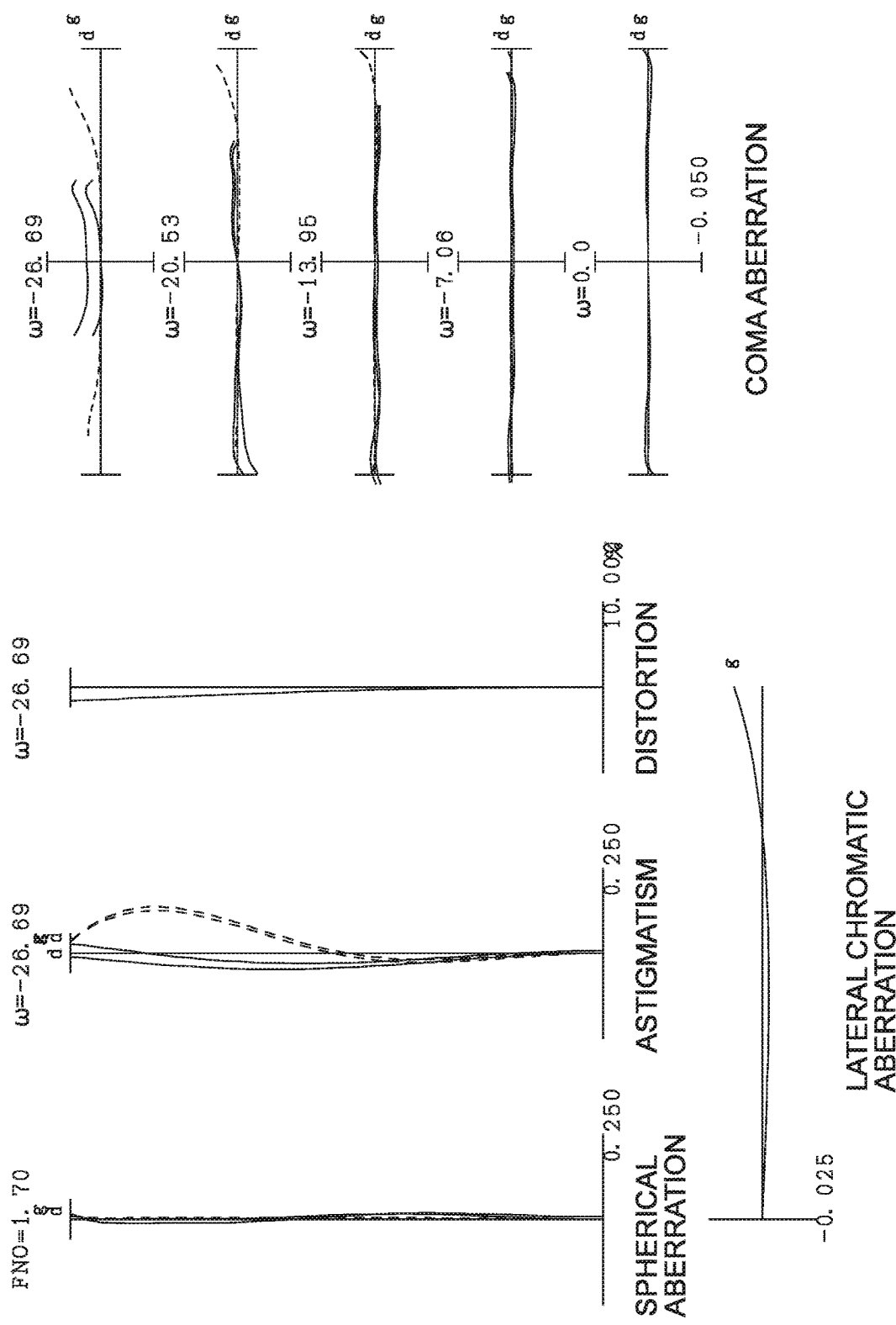
Figure 8C:
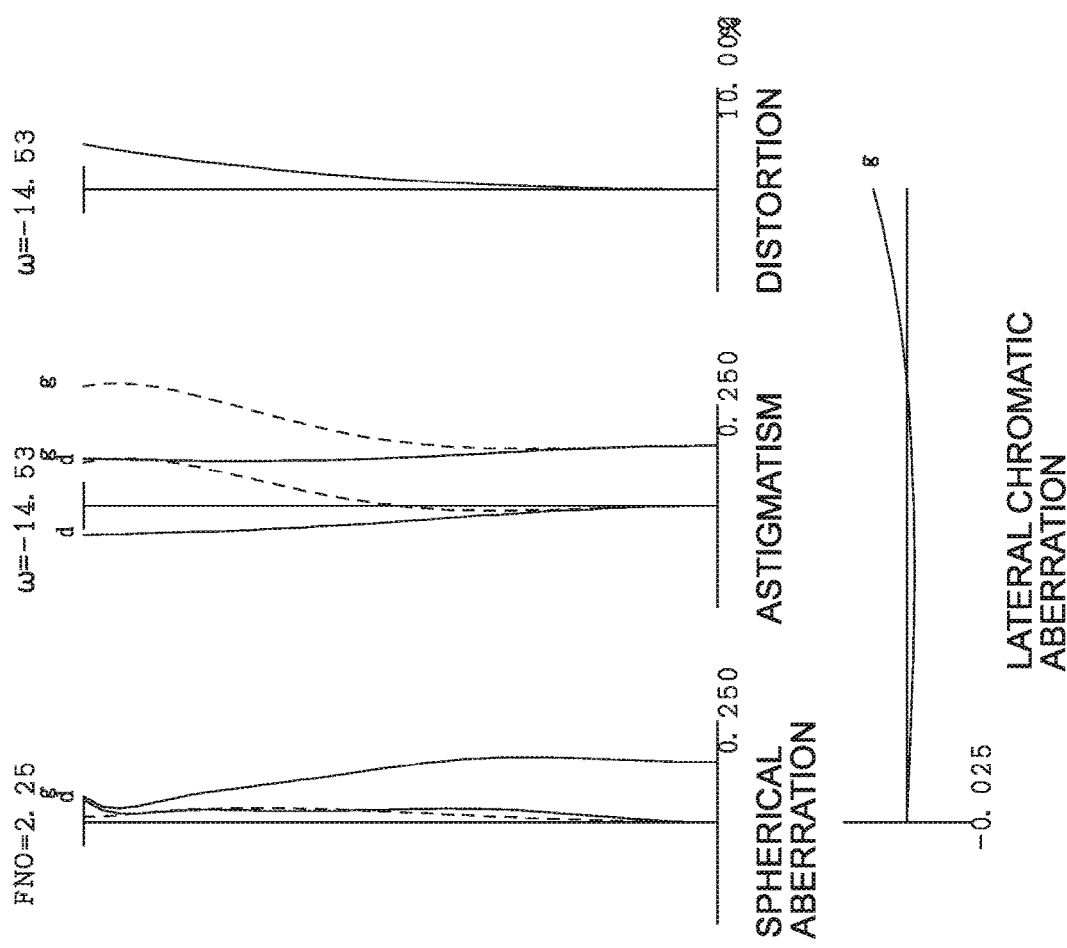

FIGS. 8A, 8B, and 8C each show various aberrations of the zoom lens ZL(4) according to Example 4 upon focusing on infinity in the wide-angle end state, in the intermediate focal length state, and in the telephoto end state. As seen from graphs showing various aberrations each, the zoom lens ZL(4) according to Example 4 successfully corrects various aberrations from the wide-angle end state to the telephoto end state to have excellent imaging performance.

Each Example descried above shows one specific example of the present invention, but the invention of the present application is not limited thereto.

The following content can be appropriately adopted within the range in which optical performance of the zoom lens according to the present embodiment is not adversely affected.

As Examples of the zoom lenses according to the present embodiments, the zoom lens of configuration of five lens groups has been shown, but the present application is not limited thereto, and a zoom lens of configuration of any other lens group (for example, six lens groups) can also be formed. Specifically, the zoom lens may have a configuration in which a lens or a lens group is added to a place closest to the object or the image surface of the zoom lens according to the present embodiment. It should be noted that the lens group means a part having at least one lens separated by a distance that changes upon zooming.

The zoom lens may be formed as a focusing lens group in which focusing is performed from an infinite distance object to the short distance object by moving a single lens group, a plurality of lens groups, or a partial lens group in the optical axis direction. The focusing lens group can also be applied to auto focusing, and is also suitable for motor driving for auto focusing (using an ultrasonic motor, or the like).

The zoom lens may be formed as the vibration-proof lens group in which image blur caused by the image shake is corrected by moving the lens group or the partial lens group so as to have a component in the direction perpendicular to the optical axis, or rotationally moving (swinging) the lens group or the partial lens group in an in-plane direction including the optical axis.

The lens surface may be formed of a spherical surface or a flat surface, or an aspherical surface. When the lens surface is spherical or flat, lens processing and assembly adjustment are facilitated, and deterioration of the optical performance caused by an error in processing and assembly adjustment can be prevented, and therefore such a case is preferable. In addition, even when the image surface is shifted, deterioration of drawing performance is less, and therefore such a case is preferable.

When the lens surface is aspherical, the aspherical surface may be any of an aspherical surface by grinding, a glass mold aspherical surface on which a glass is formed in the aspherical shape in a mold, and a composite type aspherical surface in which a resin is formed on a glass surface in the aspherical shape. In addition, the lens surface may be formed as a diffraction surface, or the lens may be formed as a gradient index lens (GRIN lens) or a plastic lens.

The aperture stop is preferably arranged in the vicinity of or within the third lens group, but a role thereof may be substituted by using a lens frame without providing a member as the aperture stop.

An anti-reflective coating having high transmittance in a wide wavelength region may be applied onto each lens surface in order to reduce flare or ghost to achieve the optical performance with high contrast.

In the zoom lens according to the present embodiment, a zooming rate is about 1.5 to about 7.5.

EXPLANATION OF NUMERALS AND CHARACTERS

G1 First lens group
G2 Second lens group
G3 Third lens group
G4 Fourth lens group
G5 Fifth lens group
FL Filter
I Image surface
S Aperture stop

The invention claimed is:

1. A zoom lens, comprising: in order from an object, a first lens group having positive refractive power; a second lens group having negative refractive power; a third lens group having positive refractive power; a fourth lens group having negative refractive power; and a fifth lens group having positive refractive power, wherein
upon zooming from a wide-angle end state to a telephoto end state,
a distance between each of lens groups and a lens group adjacent thereto changes to satisfy the following conditional expression:

$$2.90 < |MV5/MV2| < 11.50$$

where,
MV5 denotes, upon zooming from the wide-angle end state to the telephoto end state, a moving amount of the fifth lens group with an image surface as a reference; and MV2 denotes, upon zooming from the wide-angle end state to the telephoto end state, a moving amount of the second lens group with the image surface as a reference, and wherein the following conditional expression is satisfied:

$$1.20 < \beta 2t/\beta 2w < 2.50$$

where,

β2t denotes a magnification of the second lens group in the telephoto end state; and β2w denotes a magnification of the second lens group in the wide-angle end state.

2. The zoom lens according to claim 1, which satisfies the following conditional expression:

$$6.00 < |MV4/MV2| < 15.00$$

where,

MV4 denotes, upon zooming from the wide-angle end state to the telephoto end state, a moving amount of the fourth lens group with the image surface as a reference.

3. The zoom lens according to claim 1, wherein, upon zooming from the wide-angle end state to the telephoto end state, the fifth lens group moves toward an image.

4. The zoom lens according to claim 1, which satisfies the following conditional expression:

$$0.10 < (\beta 2t \times \beta 4w)/(\beta 2w \times \beta 4t) < 2.40$$

where,

β2t denotes a magnification of the second lens group in the telephoto end state;

β2w denotes a magnification of the second lens group in the wide-angle end state;

β4t denotes a magnification of the fourth lens group in the telephoto end state; and β4w denotes a magnification of the fourth lens group in the wide-angle end state.

5. The zoom lens according to claim 1, which satisfies the following conditional expression:

$$1.50 < TLt/ft < 5.00$$

where,

TLt denotes a total length of the zoom lens in the telephoto end state; and ft denotes a focal length of the zoom lens as a whole in the telephoto end state.

6. The zoom lens according to claim 1, which satisfies the following conditional expression:

$$28.0 < \omega w < 65.0$$

where, ωw is a half angle of view (unit: degree) of the zoom lens as a whole in the wide-angle end state.

7. The zoom lens according to claim 1, which satisfies the following conditional expression:

$$5.0 < \omega t < 25.0$$

where,

ωt denotes a half angle of view (unit: degree) of the zoom lens as a whole in the telephoto end state.

8. The zoom lens according to claim 1, wherein at least part of the fourth lens group is moved for focusing.

9. The zoom lens according to claim 1, wherein at least part of the third lens group comprises a component displaceable in a direction perpendicular to an optical axis.

10. An optical apparatus, comprising the zoom lens according to claim 1.

11. A zoom lens, comprising: in order from an object, a first lens group having positive refractive power; a second lens group having negative refractive power; a third lens group having positive refractive power; a fourth lens group having negative refractive power; and a fifth lens group having positive refractive power, wherein upon zooming from a wide-angle end state to a telephoto end state, a distance between each of lens groups and a lens group adjacent thereto changes to satisfy the following conditional expression:

$$6.00 < |MV4/MV2| < 15.00$$

where,

MV4 denotes, upon zooming from the wide-angle end state to the telephoto end state, a moving amount of the fourth lens group with an image surface as a reference; and MV2 denotes, upon zooming from the wide-angle end state to the telephoto end state, a moving amount of the second lens group with the image surface as a reference, and wherein the following conditional expression is satisfied:

$$1.20 < \beta 2t/\beta 2w < 2.50$$

where,

β2t denotes a magnification of the second lens group in the telephoto end state; and β2w denotes a magnification of the second lens group in the wide-angle end state.

12. The zoom lens according to claim 11, wherein, upon zooming from the wide-angle end state to the telephoto end state, the fifth lens group moves toward an image.

13. The zoom lens according to claim 11, which satisfies the following conditional expression:

$$0.10 < (\beta 2t \times \beta 4w)/(\beta 2w \times \beta 4t) < 2.40$$

where,

β2t denotes a magnification of the second lens group in the telephoto end state;

β2w denotes a magnification of the second lens group in the wide-angle end state;

β4t denotes a magnification of the fourth lens group in the telephoto end state; and β4w denotes a magnification of the fourth lens group in the wide-angle end state.

14. The zoom lens according to claim 11, which satisfies the following conditional expression:

$$1.50 < TLt/ft < 5.00$$

where,

TLt denotes a total length of the zoom lens in the telephoto end state; and ft denotes a focal length of the zoom lens as a whole in the telephoto end state.

15. The zoom lens according to claim 11, which satisfies the following conditional expression:

$$28.0 < \omega w < 65.0$$

where, ωw is a half angle of view (unit: degree) of the zoom lens as a whole in the wide-angle end state.

16. The zoom lens according to claim 11, which satisfies the following conditional expression:

$$5.0 < \omega t < 25.0$$

where,

ωt denotes a half angle of view (unit: degree) of the zoom lens as a whole in the telephoto end state.

17. The zoom lens according to claim 11, wherein at least part of the fourth lens group is moved for focusing.

18. The zoom lens according to claim 11, wherein at least part of the third lens group comprises a component displaceable in a direction perpendicular to an optical axis.

19. An optical apparatus, comprising the zoom lens according to claim 11.

20. A method for manufacturing a zoom lens which comprises, in order from an object, a first lens group having positive refractive power; a second lens group having negative refractive power; a third lens group having positive refractive power; a fourth lens group having negative refractive power; and the fifth lens group having positive refractive power, the method comprising arranging the first to the fifth lens groups within a lens barrel in such a manner that:

upon zooming from a wide-angle end state to a telephoto end state, a distance between each of lens groups and a lens group adjacent thereto changes to satisfy the following conditional expression:

$$2.90 < |MV5/MV2| < 11.50$$

where,

MV5 denotes, upon zooming from the wide-angle end state to the telephoto end state, a moving amount of the fifth lens group with an image surface as a reference; and MV2 denotes, upon zooming from the wide-angle end state to the telephoto end state, a moving amount of the second lens group with the image surface as a reference, the method further comprising satisfying the following conditional expression:

$$1.20 < \beta 2t/\beta 2w < 2.50$$

where, $\beta 2t$ denotes a magnification of the second lens group in the telephoto end state; and $\beta 2w$ denotes a magnification of the second lens group in the wide-angle end state.

21. A method for manufacturing a zoom lens which comprises, in order from an object, a first lens group having positive refractive power; a second lens group having negative refractive power; a third lens group having positive refractive power; a fourth lens group having negative refractive power; and a fifth lens group having positive refractive power, the method comprising arranging the first to the fifth lens groups within a lens barrel in such a manner that:

upon zooming from a wide-angle end state to a telephoto end state, a distance between each of lens groups and a lens group adjacent thereto changes to satisfy the following conditional expression:

$$6.00 < |MV4/MV2| < 15.00$$

where,

MV4 denotes, upon zooming from the wide-angle end state to the telephoto end state, a moving amount of the fourth lens group with an image surface as a reference; and MV2 denotes, upon zooming from the wide-angle end state to the telephoto end state, a moving amount of the second lens group with the image surface as a reference, the method further comprising satisfying the following conditional expression:

$$1.20 < \beta 2t/\beta 2w < 2.50$$

where, $\beta 2t$ denotes a magnification of the second lens group in the telephoto end state; and $\beta 2w$ denotes a magnification of the second lens group in the wide-angle end state.

* * * * *